United States Patent
Kinoshita et al.

(10) Patent No.: US 10,203,688 B2
(45) Date of Patent: Feb. 12, 2019

(54) MANUFACTURING DEVICE, SYSTEM AND METHOD FOR OUTPUTTING A MANUFACTURING PROCESS FLOW HAVING THE SHORTEST TOTAL PROCESS TIME AMONG A PLURALITY OF MANUFACTURING PROCESS FLOWS

(71) Applicant: HITACHI, LTD., Tokyo (JP)

(72) Inventors: Masaharu Kinoshita, Tokyo (JP); Nobuyuki Sugii, Tokyo (JP); Tomonori Sekiguchi, Tokyo (JP); Shuntaro Machida, Tokyo (JP); Tetsufumi Kawamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 139 days.

(21) Appl. No.: 15/593,747

(22) Filed: May 12, 2017

(65) Prior Publication Data

US 2018/0017958 A1 Jan. 18, 2018

(30) Foreign Application Priority Data

Jul. 15, 2016 (JP) ................................ 2016-140570

(51) Int. Cl.
*G06F 19/00* (2018.01)
*G05B 19/4099* (2006.01)

(52) U.S. Cl.
CPC .............. *G05B 19/4099* (2013.01); *G05B 2219/31342* (2013.01); *G05B 2219/35008* (2013.01); *G05B 2219/35499* (2013.01)

(58) Field of Classification Search
CPC ...................................................... G06F 17/50
(Continued)

(56) References Cited

U.S. PATENT DOCUMENTS 5,790,950 A * 8/1998 Suzuki ..................... G06T 15/10
435/427
6,737,668 B2 * 5/2004 Den ...................... B01D 67/0065
257/9

(Continued)

FOREIGN PATENT DOCUMENTS

JP 2004-209626 A1 7/2004
JP 2005-074605 A1 3/2005

OTHER PUBLICATIONS

Kratt et al, A fully MEMS-compatible process for 3D high aspect ratio micro coils obtained with an automatic wire bonder, Feb. 12, 2009, Journal of Micromechanics and Microengineering, pp. 12 (Year: 2009).*

(Continued)

*Primary Examiner* — Suresh Suryawanshi
(74) *Attorney, Agent, or Firm* — Mattingly & Malur, PC

(57) ABSTRACT

A manufacturing device inputs design information including three-dimensional structure data, generates a manufacturing process flow, and displays the manufacturing process flow on a screen for a user to check, modify, and confirm the flow based on design information and setting information. A process method includes a first process method of a direct modeling method having an FIB method and a second process method of a semiconductor manufacturing process method which is a non-FIB method. The manufacturing device generates a plurality of manufacturing process flows by a combination of cases where each of the process methods is applied to each of the regions of the three-dimensional data. The manufacturing process flow includes a process device, the process method, a control parameter value, a process time, and a total process time for each of process steps. An output unit outputs a manufacturing pro- (Continued)

cess flow having, for example, the shortest total process time.

11 Claims, 21 Drawing Sheets

(58) Field of Classification Search
USPC .......................................................... 700/98
See application file for complete search history.

(56) References Cited

U.S. PATENT DOCUMENTS

| | | | |
|---|---|---|---|
| 7,267,731 B2 | 9/2007 | Iwasaki | |
| 8,355,023 B2* | 1/2013 | Okada | G06F 17/5081 345/418 |
| 8,415,202 B2* | 4/2013 | Ohba | B81C 1/00238 257/723 |
| 2015/0287502 A1* | 10/2015 | Sasaki | H01L 39/126 505/150 |
| 2017/0309566 A1* | 10/2017 | Watanabe | H01L 21/70 |

OTHER PUBLICATIONS

Stiebing et al, Challenges in the Reliability of 3D Integration using TSVs, 2015, IEEE, pp. 8 (Year: 2015).*

* cited by examiner

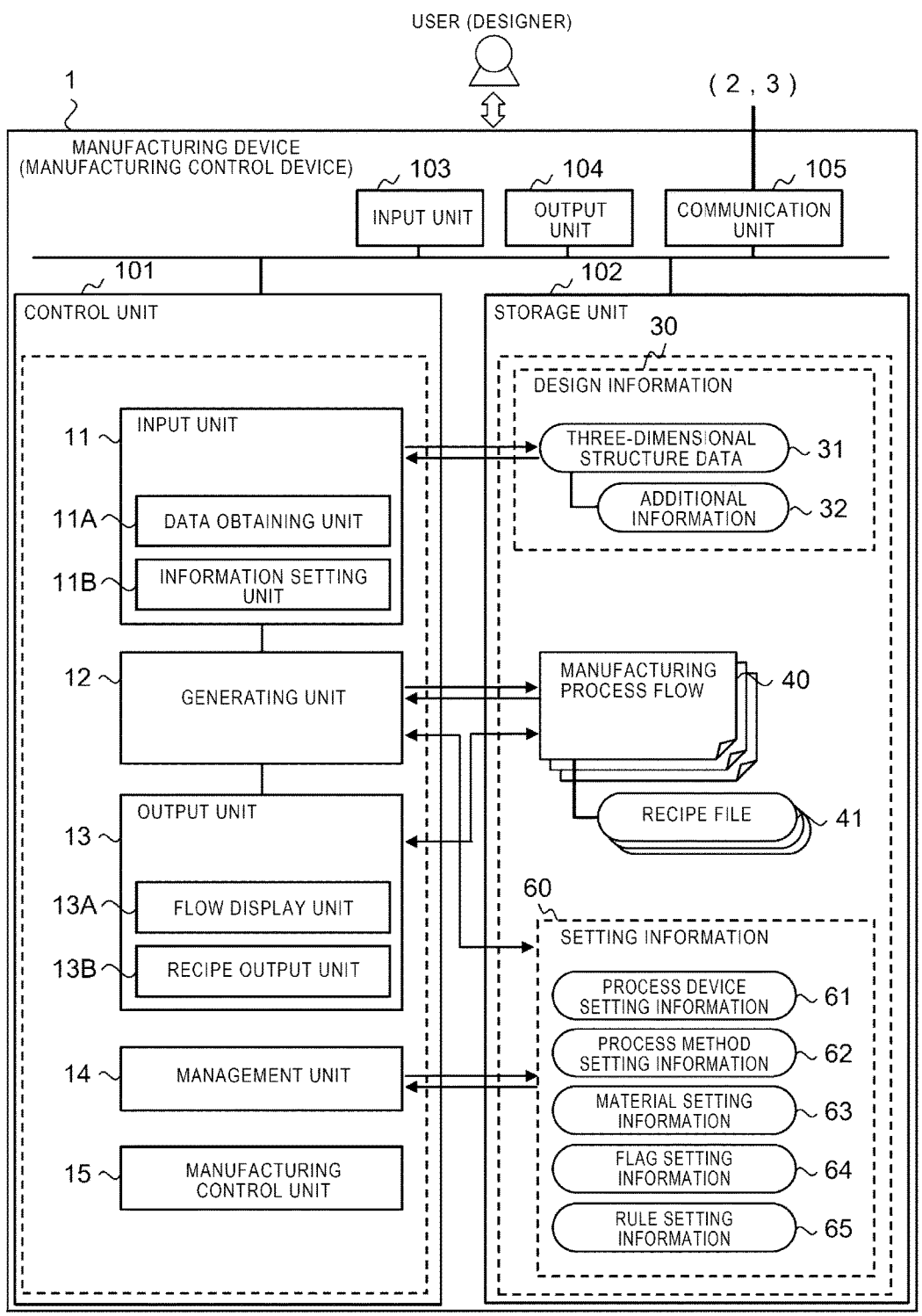

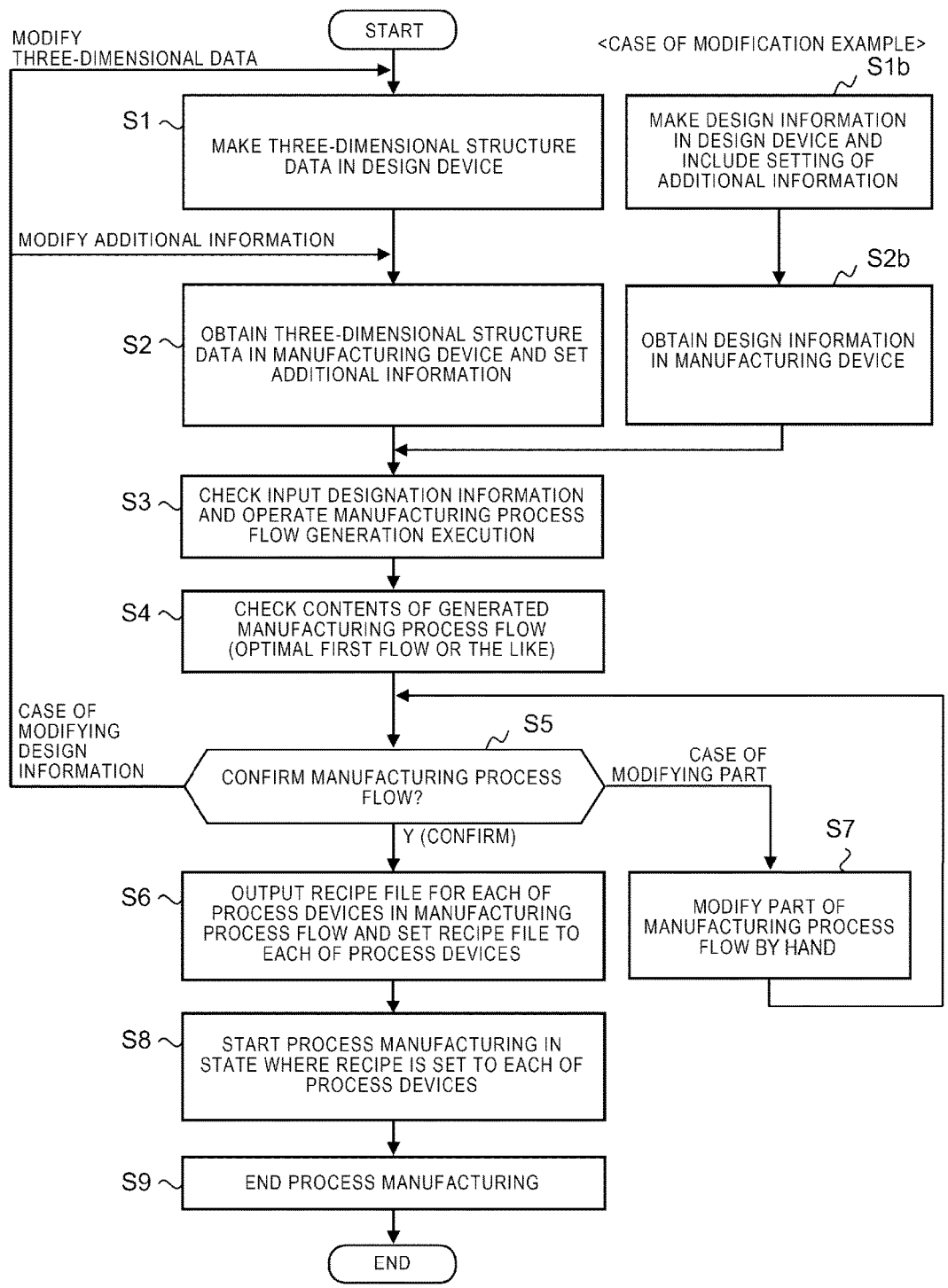

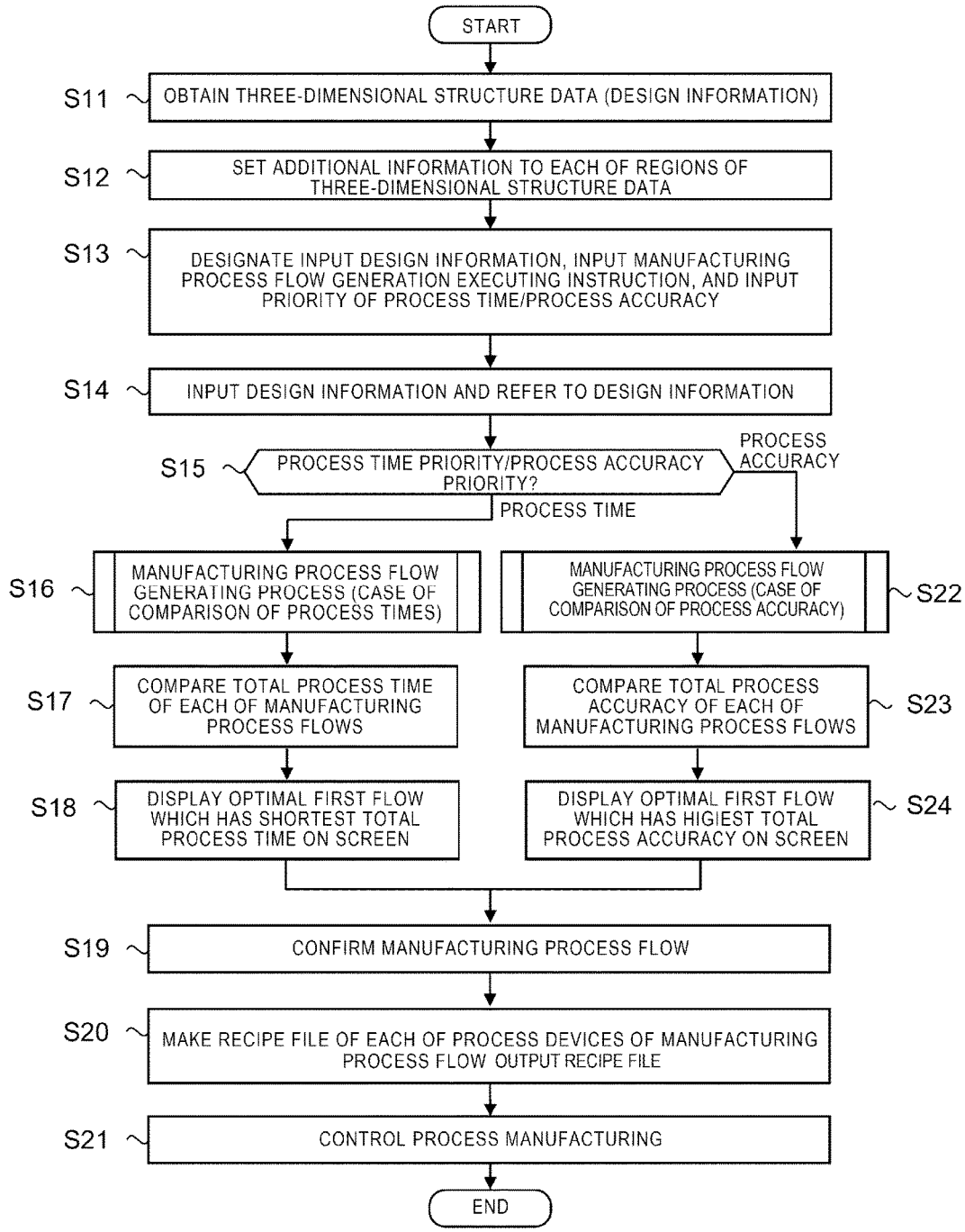

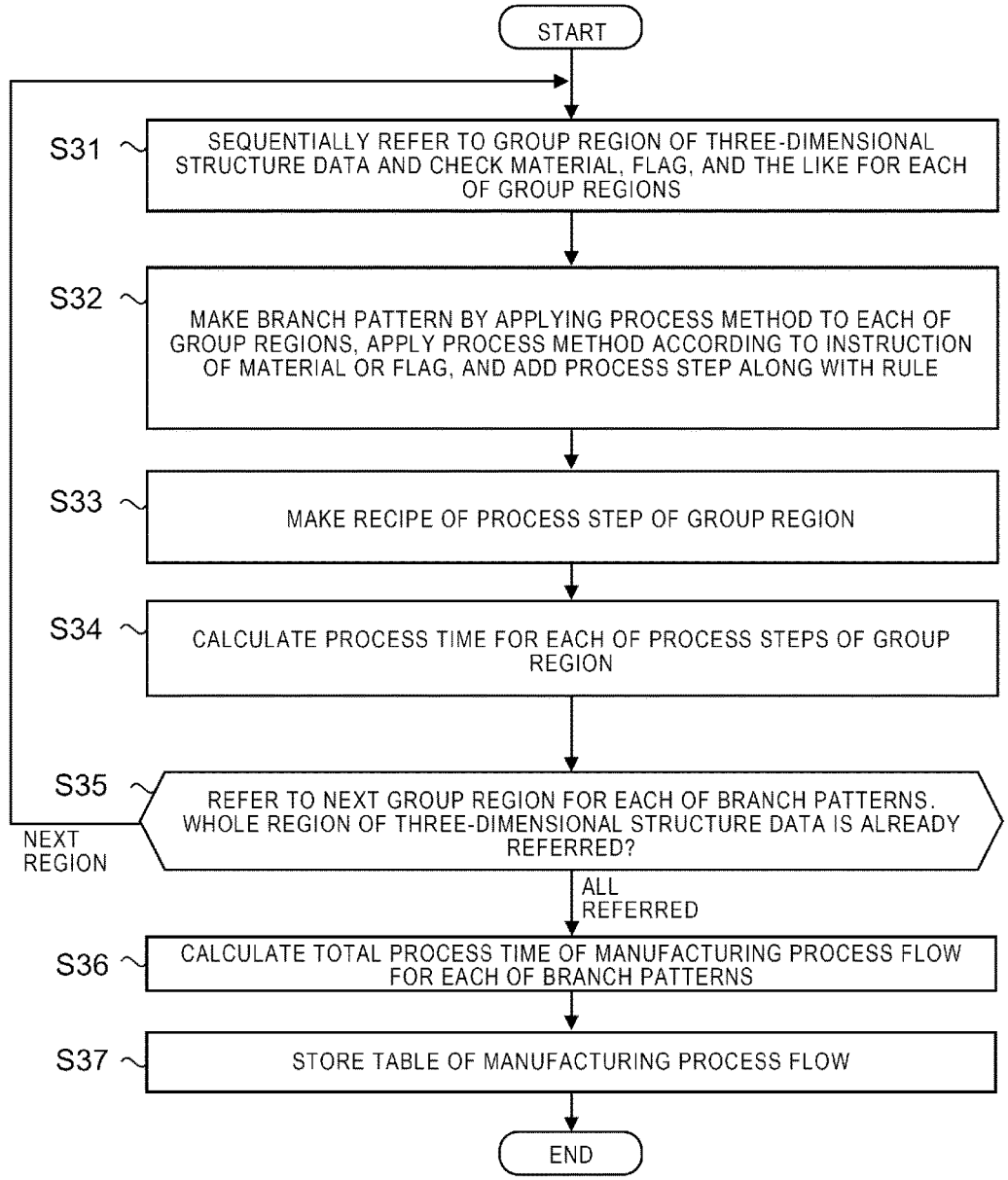

FIG. 6
PROCESS DEVICE SETTING INFORMATION 61

| LINE # | PROCESS DEVICE ID | TYPE | PROCESS METHOD CLASSIFICATION | PROCESS METHOD ID | RECIPE CONTROL PARAMETER | ... |
|---|---|---|---|---|---|---|
| 1 | #1 (F1) | FIB | FIB-DEPOSITION | depo-A1 | · pDA11<br>· pDA12<br>...... | ... |
| | | | | depo-A2 | · pDA21<br>· pDA22<br>...... | ... |
| | | | | ...... | ...... | ... |
| | | | FIB-ETCHING | etch-A1 | · pEA11, ... | ... |
| | | | | etch-A2 | · pEA21, ... | ... |
| | | | | ...... | ...... | ... |
| 2 | #2 (F2) | FIB | FIB-DEPOSITION | depo-B1 | · pDB11, ... | ... |
| | | | | depo-B2 | · pDB21, ... | ... |
| | | | | ...... | ...... | ... |
| | | | FIB-ETCHING | etch-B1 | · pEB11, ... | ... |
| | | | | etch-B2 | · pEB21, ... | ... |
| | | | | ...... | ...... | ... |
| 3 | #3 (M1) | NON-FIB | PHOTOLITHOGRAPHY | Litho-1 | · pL11, ... | ... |
| | | | | Litho-2 | · pL21, ... | ... |
| | | | | ...... | ...... | ... |
| 4 | #4 (M2) | NON-FIB | ETCHING, DRY, RIE | dry-etch-1 | · pde11, ... | ... |
| | | | | dry-etch-2 | · pde21, ... | ... |
| 5 | #5 (M3) | NON-FIB | ETCHING, WET, RELEASE | wet-etch-1 | · pwe11, ... | ... |
| | | | | wet-etch-2 | · pwe21, ... | ... |
| 6 | #6 | CVD | DEPOSITION | CVD-depo-1 | · pC11, ... | ... |
| | | | | CVD-depo-2 | · pC21, ... | ... |
| 7 | #7 | CMP | PLANARIZATION | CMP-1 | · pM11, ... | ... |
| 8 | #8 | VPE | ETCHING, RELEASE | VPE-1 | · pV11, ... | ... |
| 9 | #9 | CLEANING | CLEANING | BC-1 | · pbc11, ... | ... |
| | | | | BC-2 | · pbc21, ... | ... |
| | | | | FC-1 | · pfc11, ... | ... |
| | | | | ... | ... | ... |
| ... | ... | ... | ... | ... | ... | ... |

FIG. 7

PROCESS METHOD SETTING INFORMATION 62

| PROCESS METHOD | PROCESS METHOD CLASSIFICATION | PROCESS DEVICE | MATERIAL | PROCESS ACCURACY | PROCESS RATE | PROCESS TIME SETTING VALUE |
|---|---|---|---|---|---|---|
| etch-A1 | FIB-ETCHING | #1 ( F1 ), #2 ( F2 ) | Si | ... [ nm ] | ... [nm/MIN] | - |
| | | | SiO | ... [ nm ] | ... [nm/MIN] | - |
| | | | SiN | ... [ nm ] | ... [nm/MIN] | - |
| | | | ... | ... [ nm ] | ... [nm/MIN] | - |
| dry-etch-1 | ETCHING, DRY, RIE | #4 ( M1 ) | Si | ... [ nm ] | ... [nm/MIN] | - |
| | | | SiO | ... [ nm ] | ... [nm/MIN] | - |
| | | | SiN | ... [ nm ] | ... [nm/MIN] | - |
| | | | ... | ... [ nm ] | ... [nm/MIN] | - |
| wet-etch-1 | ETCHING, WET, RELEASE | #5 ( M2 ) | Si | ... [ nm ] | ... [nm/MIN] | - |
| | | | SiO | ... [ nm ] | ... [nm/MIN] | - |
| | | | SiN | ... [ nm ] | ... [nm/MIN] | - |
| | | | W | ... [ nm ] | ... [nm/MIN] | - |
| | | | Al | ... [ nm ] | ... [nm/MIN] | - |
| VPE-1 | RELEASE, ETCHING | #8 | SiO | ... [ nm ] | ... [nm/MIN] | - |
| ... | ... | ... | ... | ... | ... | ... |
| BC-1 | CLEANING | #9 | ... | ... | - | c1 (CONSTANT VALUE) |
| ... | ... | ... | ... | ... | ... | ... |

FIG. 8
MATERIAL SETTING INFORMATION 63

| MATERIAL VALUE | MATERIAL | EXPLANATION |
|---|---|---|
| m1 | Si | Silicon |
| m2 | SiN | Silicon Nitride |
| m3 | $SiO_2$ | Silicon Oxide |
| m4 | ... | ... |
| ... | ... | ... |
| ma | void | VOID |
| mb | Air | AIR |
| mc | ... | VACUUM |
| ... | ... | ... |

FIG. 9
FLAG SETTING INFORMATION 64

| FLAG VALUE | FLAG CONTENTS | EXPLANATION |
|---|---|---|
| f0=i | initial | INITIAL (NON-PROCESS) |
| f1=d | deposition | PROCESS METHOD CLASSIFICATION DESIGNATION EXAMPLE 1 (DEPOSITION) |
| f2=e | etching | PROCESS METHOD CLASSIFICATION DESIGNATION EXAMPLE 2 (ETCHING) |
| f3=r | released | PROCESS METHOD CLASSIFICATION DESIGNATION EXAMPLE 3 (RELEASE) |
| f4=p | planarization | PROCESS METHOD CLASSIFICATION DESIGNATION EXAMPLE 4 (PLANARIZATION) |
| ... | ... | ... |
| f11 | depo-A1 | PROCESS METHOD   DESIGNATION EXAMPLE 1 |
| f12 | dry-etch-1 | PROCESS METHOD   DESIGNATION EXAMPLE 2 |
| f13 | VPE-1 | PROCESS METHOD   DESIGNATION EXAMPLE 3 |
| ... | ... | ... |
| f21 | #1 ( F1) | PROCESS METHOD   DESIGNATION EXAMPLE 1 |
| ... | ... | ... |

FIG. 10

RULE SETTING INFORMATION 65

| PROCESS STEP PROCESS METHOD | PRE-PROCESS STEP PROCESS METHOD | POST-PROCESS STEP PROCESS METHOD |
|---|---|---|
| BC-1 ( Backside Cleaning-1 ) | depo-1 | Litho-1 |
| BC-2 ( Backside Cleaning-1 ) | depo-2 | Litho-2 |
| …… | …… | …… |
| BC-1 ( Backside Cleaning-1 ) | etch-1 | depo-1 |
| BC-2 ( Backside Cleaning-2 ) | etch-2 | depo-2 |
| …… | …… | …… |
| FC-1 ( Frontside Cleaning-1 ) | etch-1 | depo-1 |
| FC-2 ( Frontside Cleaning-2 ) | etch-2 | depo-2 |
| …… | …… | …… |

FIG. 11

MANUFACTURING PROCESS FLOW (GENERAL)

MANUFACTURING PROCESS FLOW ID: PF001
STRUCTURE ID:
CREATED DATE: 2016/4/1
TOTAL PROCESS TIME:        T001=...... [DAY, TIME, MIN, AND SEC]
TOTAL PROCESS ACCURACY: A001=......

| PROCESS STEP | PROCESS TARGET REGION | PROCESS DEVICE | PROCESS METHOD CLASSIFICATION | RECIPE | | PROCESS TIME | PROCESS ACCURACY |
| | | | | PROCESS METHOD | CONTROL PARAMETER VALUE | | |
|---|---|---|---|---|---|---|---|
| P1 | G1, R1 | #1 (F1) | ETCHING | etch-A1 | · $pEA11$=... <br> · $pEA12$=... | $t1$=... | $a1$=... |
| P2 | G2, R2 | #1 (F1) | ETCHING | etch-A2 | · $pEA21$=... <br> · $pEA22$=... | $t2$=... | $a2$=... |
| P3 | G3, R31 ~ R33 | #1 (F1) | DEPOSITION | depo-A1 | · $pDA11$=... <br> · $pDA12$=... | $t3$=... | $a3$=... |
| P4 | G4, R4 | #4 (M2) | ETCHING | dry-etch-1 | · $pde11$=... <br> · $pde12$=... | $t4$=... | $a4$=... |
| P5 | G5, R5 | #6 | DEPOSITION | CVD-depo-1 | · $pC21$=... <br> · $pC22$=... | $t5$=... | $a5$=... |
| ... | ... | ... | ... | ... | ... | ... | ... |
| PN | ... | ... | ... | ... | ... | $tN$=... | $aN$=... |

PROCESS STEP IN CASE OF ETCHING OF FIB METHOD

THREE-DIMENSIONAL IMAGE OF EXAMPLE OF STRUCTURE

THREE-DIMENSIONAL DATA AND ADDITIONAL INFORMATION OF INPUT STRUCTURE

FIG. 17

MANUFACTURING PROCESS FLOW SCREEN

171 — MANUFACTURING PROCESS FLOW ID: PF001    STRUCTURE ID: D001
CREATED DATE: 2016/4/1    TOTAL PROCESS TIME: T001=......

172 — MANUFACTURING PROCESS FLOW (OPTIMAL FIRST FLOW: SHORTEST TOTAL PROCESS TIME)

| INPUT | | | OUTPUT | | |
|---|---|---|---|---|---|
| 3D DATA ID | ... | MATERIAL ... | PROCESS STEP NUMBER | PROCESS DEVICE | RECIPE (MATERIAL AND PROCESS METHOD) |
| G1 | ... | Si ... | P1 | - | - |
| G2 | ... | SiN ... | P2 | CVD DEVICE (#6) | SiN , CVD-depo-1 |
|  |  |  | P3 | CLEANING DEVICE (#9) | BC-1 |
| G3 | ... | SiO$_2$ ... | P4 | FIB DEVICE (#1) | SiN , etch-A1 |
|  |  |  | P5 | FIB DEVICE (#1) | Si , etch-A1 |
|  |  |  | P6 | CLEANING DEVICE (#9) | BC-2 |
|  |  |  | P7 | CVD DEVICE (#6) | SiO , CVD-depo-1 |
|  |  |  | P8 | CLEANING DEVICE (#9) | BC-2 |
|  |  |  | P9 | CMP DEVICE (#7) | SiO , CMP1 |
| ... | ... | ... ... | ... | ... | ... |
| G8 | ... | Air ... | P14 | VPE DEVICE (#8) | SiO , VPE-1 |

173 — OPERATION MENU

CONFIRM (RECIPE FILE OUTPUT)    173A

NEXT CANDIDATE FLOW DISPLAY    173B

THREE-DIMENSIONAL DATA MODIFICATION (REJECTION)    173C

END

FIG. 18
MANUFACTURING PROCESS FLOW TABLE (FIRST EXAMPLE)
(PROCESS TIME PRIORITY)

| INPUT | | | | OUTPUT | | |
|---|---|---|---|---|---|---|
| THREE-DIMENSIONAL INPUT DATA ID | COORDINATE DATA | MATERIAL | FLAG | PROCESS STEP NUMBER | PROCESS DEVICE | RECIPE (MATERIAL AND PROCESS METHOD) |
| G1 (R1) | ... | Si | i | P1 | - | - |
| G2 (R2) | ... | SiN | d | P2 | CVD DEVICE (#6) | SiN, CVD-depo-1 |
| | | | | P3 | CLEANING DEVICE (#9) | BC-1 |
| G3 (R31~R33) | ... | SiO$_2$ | e, d, p | P4 | FIB DEVICE (#1) | SiN, etch-A1 |
| | | | | P5 | FIB DEVICE (#1) | Si, etch-A1 |
| | | | | P6 | CLEANING DEVICE (#9) | BC-2 |
| | | | | P7 | CVD DEVICE (#6) | SiO, CVD-depo-1 |
| | | | | P8 | CLEANING DEVICE (#9) | BC-2 |
| | | | | P9 | CMP DEVICE (#7) | SiO, CMP-1 |
| G4 (R4) | ... | SiO$_2$ | d | P10 | CVD DEVICE (#6) | SiO, CVD-depo-2 |
| G5 (R5) | ... | Si | - | P11 | FIB DEVICE (#1) | Si, depo-A1 |
| G6 (R6) | ... | Si | - | P12 | FIB DEVICE (#1) | Si, depo-A2 |
| G7 (R7) | ... | Air | e | P13 | FIB DEVICE (#1) | Si, etch-A3 |
| G8 (R81~R83) | ... | Air | r | P14 | VPE DEVICE (#8) | SiO, VPE-1 |

FIG. 19
MANUFACTURING PROCESS FLOW TABLE (SECOND EXAMPLE)
(PROCESS ACCURACY PRIORITY)

| INPUT | | | | OUTPUT | | |
|---|---|---|---|---|---|---|
| THREE DIMENSIONAL INPUT DATA ID | COORDINATE DATA | MATERIAL | FLAG | PROCESS STEP NUMBER | PROCESS DEVICE | RECIPE (MATERIAL AND PROCESS METHOD) |
| G1 | ... | Si | i | P1 | - | - |
| G2 | ... | SiN | d | P2 | CVD DEVICE (#6) | SiN , CVD-depo-1 |
| | | | | P3 | CLEANING DEVICE (#9) | BC-1 |
| G3 | ... | SiO | e, d, p | P4 | LITHOGRAPHY DEVICE (#3) | Litho-1 |
| | | | | P5 | ETCHING DEVICE (#4) | SiN , dry-etch-1 |
| | | | | P6 | ETCHING DEVICE (#4) | Si , dry-etch-1 |
| | | | | P7 | CLEANING DEVICE (#9) | BC-1 |
| | | | | P8 | LITHOGRAPHY DEVICE (#3) | Litho-2 |
| | | | | P9 | ETCHING DEVICE (#4) | SiN , dry-etch-1 |
| | | | | P10 | ETCHING DEVICE (#4) | Si , dry-etch-1 |
| | | | | P11 | CLEANING DEVICE (#9) | BC-1 |
| | | | | P12 | LITHOGRAPHY DEVICE (#3) | Litho-3 |
| | | | | P13 | ETCHING DEVICE (#4) | SiN , dry-etch-1 |
| | | | | P14 | ETCHING DEVICE (#4) | Si , dry-etch-1 |
| | | | | P15 | CLEANING DEVICE (#9) | BC-1 |
| | | | | P16 | CVD DEVICE (#6) | SiO , CVD-depo-1 |
| | | | | P17 | CLEANING DEVICE (#9) | BC-1 |
| | | | | P18 | CMP DEVICE (#7) | SiO , CMP-1 |
| G4 | ... | SiO | d | P19 | CVD DEVICE (#6) | SiO , CVD-depo-2 |
| G5 | ... | Si | - | P20 | FIB DEVICE (#1) | Si , depo-A1 |
| G6 | ... | Si | - | P21 | FIB DEVICE (#1) | Si , depo-A2 |
| G7 | ... | Air | e | P22 | FIB DEVICE (#1) | Si , etch-A4 |
| G8 | ... | Air | r | P23 | VPE DEVICE (#8) | SiO , VPE-1 |

FIG. 20
MANUFACTURING PROCESS FLOW TABLE (THIRD EXAMPLE)
(PROCESS TIME PRIORITY)

| INPUT | | | | OUTPUT | | |
|---|---|---|---|---|---|---|
| THREE-DIMENSIONAL INPUT DATA ID | COORDINATE DATA | MATERIAL | FLAG | PROCESS STEP NUMBER | PROCESS DEVICE | RECIPE (MATERIAL AND PROCESS METHOD) |
| G1 | ... | Si | i | P1 | - | - |
| G2 | ... | SiN | d | P2 | CVD DEVICE (#6) | SiN , depo-1 |
| | | | | P3 | CLEANING DEVICE (#9) | BC-1 |
| G3 | ... | SiO | e, d, p | P4 | FIB DEVICE (#1) | SiN , etch-A1 |
| | | | | P5 | FIB DEVICE (#1) | Si , etch-A1 |
| | | | | P6 | CLEANING DEVICE (#9) | BC-1 |
| | | | | P7 | CVD DEVICE (#6) | SiO , CVD-depo-1 |
| | | | | P8 | CLEANING DEVICE (#9) | BC-1 |
| | | | | P9 | CMP DEVICE (#7) | SiO , CMP-1 |
| G4 | ... | SiO | d | P10 | CVD DEVICE (#6) | SiO , CVD-depo-2 |
| G5 | ... | Si | - | P11 | CVD DEVICE (#6) | Si , CVD-depo-1 |
| | | | | P12 | CLEANING DEVICE (#9) | BC-1 |
| | | | | P13 | LITHOGRAPHY DEVICE (#3) | Litho-1 |
| | | | | P14 | ETCHING DEVICE (#4) | Si , dry-etch-1 |
| | | | | P15 | CLEANING DEVICE (#9) | BC-1 |
| G6 | ... | Si | - | P16 | FIB DEVICE (#1) | Si , depo-A2 |
| G7 | ... | Air | e | P17 | FIB DEVICE (#1) | Si , etch-A5 |
| G8 | ... | Air | r | P18 | VPE DEVICE (#8) | SiO , VPE-1 |

MANUFACTURING DEVICE, SYSTEM AND METHOD FOR OUTPUTTING A MANUFACTURING PROCESS FLOW HAVING THE SHORTEST TOTAL PROCESS TIME AMONG A PLURALITY OF MANUFACTURING PROCESS FLOWS

BACKGROUND OF THE INVENTION

Field of the Invention

The present invention relates to a technology of design, process manufacturing, and work support for a structure.

Background Art

Various structures such as semiconductor devices using Micro Electro Mechanical Systems (MEMS) have been developed. Examples of the structure are an integrated circuit board, a sensor, and the like. For processing microstructures, micro-machining in a unit of μm or nm is required. In the related art, there are technologies such as etching, deposition, photolithography as a micro-machining technology of the semiconductor device, and there are various process methods in each of the technologies. For explanation, these are collectively referred to as semiconductor manufacturing process methods. In a case where the structure is manufactured in a manufacturing process flow using the semiconductor manufacturing process method, there are process steps such as photolithography, etching, and deposition.

In recent years, a three-dimensional printer technology and a direct modeling technology have also developed. There is focused ion beam (FIB) technology as the direct modeling technology which is one of micro-machining technologies. For explanation, a method for performing a process using FIB is collectively referred to as an FIB method. A method for performing direct modeling including the FIB method is collectively referred to as a direct modeling method. There are various process methods in the direct modeling method including the FIB method. An FIB device has functions of performing etching, deposition, observation, and the like by the FIB method. The direct modeling method including the FIB method is different from the semiconductor manufacturing process method and does not require a photolithography process step or the like. Hereinafter, the semiconductor manufacturing process method is collectively referred to as a non-FIB method. There are characteristics such as advantages depending on each of process methods of the FIB method and the non-FIB method.

Examples of the related art regarding the micro-machining technology are JP-A-2005-74605 and JP-A-2004-209626.

In JP-A-2005-74605, as nano/micromachine design/processing method and system, the followings are described. This method includes an inverse problem simulation step in processes from a process designing step to a process pattern generating step. The inverse problem simulation step is a step for obtaining a processing process and the process pattern from a design device structure and includes a semi-automatic design step. In the semi-automatic design step, a designer selects choices called by a process DB reference to lead a solution.

In JP-A-2004-209626, as methods for manufacturing a three-dimensional micro-structure and the like, the followings are described. A process device corresponding to a focused charged particle beam performs a temporary process to manufacture a prototype structure based on three-dimensional design shape data. This process device compares a shape of the prototype structure with a design shape and corrects a process condition so as to modify a difference thereof.

In structure design manufacturing in the related art, a designer designs a three-dimensional shape of a structure. The designer designs a manufacturing process flow for processing and manufacturing the structure using a process device based on structure design information. The process device is a device having a function of performing a process or the like corresponding to a process step and a process method such as etching or deposition. The manufacturing process flow of a design target is the manufacturing process flow including a process step of a non-FIB method or the manufacturing process flow including a process step of an FIB method. The designer designs the structure and the manufacturing process flow using a computer system including design software. The designer needs much labor or time for work including a design procedure for designing the structure and the manufacturing process flow. That is, in the related art, there is a problem in view of burden and efficiency of the work of the designer.

In addition, after the design procedure, there is a process procedure for executing a process of the structure using each of process devices according to the manufacturing process flow. A manufacturing procedure including the design procedure and the process procedure takes time. Particularly, in a case where trial manufacture of the structure is repeated, since the designer repeats modification or re-design of the manufacturing process flow, the designer further needs labor or time. That is, in the related art, there is a problem in view of development manufacturing efficiency of the structure.

In a case of JP-A-2005-74605, determination and work for selecting by the designer from choices presented in the semi-automatic design step are necessary.

SUMMARY OF THE INVENTION

An object of the present invention is to provide a technology capable of reducing labor involved in work regarding a design procedure of the structure manufacturing process flow of the designer and shortening a time required for the work with respect to a technology of design, process manufacturing, and work support for a structure.

A representative embodiment of the present invention is a manufacturing device or the like which supports the work including designing of the manufacturing process flow of the structure, and has the following configuration.

According to an aspect of the present invention, there is provided a manufacturing device for supporting work including designing of a manufacturing process flow of a structure including: an input unit that inputs design information including three-dimensional data of the structure from an outside based on an input operation of a user; setting information for generating the manufacturing process flow; a generating unit that generates the manufacturing process flow configured to have a plurality of process steps in order based on the design information and the setting information; and an output unit that displays the generated manufacturing process flow to the user on a screen for the user to check, modify, and confirm the manufacturing process flow, in which the setting information includes process methods, control parameters of process steps using the process method, and information for calculating a process time for each of the process methods with respect to each of a plurality of process devices for processing the structure, the process method includes a first process method of a direct modeling method having an FIB method and a second process method of a semiconductor manufacturing process method which is a non-FIB method, the generating unit generates a plurality of manufacturing process flows by a combination of cases where each of the process methods in a plurality of process methods is applied to each region of the input three-dimensional data, the plurality of manufacturing process flows include a first manufacturing process flow having a first process step in a case of using the first process method and a second manufacturing process flow having a second process step in a case of using the second process method, the manufacturing process flow includes the process device to be used, the process method, a control parameter value, the process time, and a total process time of the plurality of process steps for each of the process steps, and the output unit outputs at least a manufacturing process flow having the shortest total process time among the plurality of manufacturing process flows.

According to the representative embodiment of the present invention, it is possible to reduce labor involved in work regarding a design procedure of the structure manufacturing process flow of the designer and to shorten a time required for the work with respect to a technology of design, process manufacturing, and work support for a structure.

BRIEF DESCRIPTION OF THE DRAWINGS

FIG. 2 is a diagram illustrating a configuration of a manufacturing device according to the embodiment of the present invention.

FIG. 3 is a diagram illustrating an operation flow of a designer in the embodiment.

FIG. 4 is a diagram illustrating a process flow of a manufacturing device in the embodiment.

FIG. 5 is a diagram illustrating a process flow of a manufacturing process flow generation process in the embodiment.

FIG. 6 is a diagram illustrating a configuration example of process device setting information in the embodiment.

FIG. 7 is a diagram illustrating a configuration example of process method setting information in the embodiment.

FIG. 8 is a diagram illustrating a configuration example of material setting information in the embodiment.

FIG. 9 is a diagram illustrating a configuration example of flag setting information in the embodiment.

FIG. 10 is a diagram illustrating a configuration example of rule setting information in the embodiment.

FIG. 11 is a diagram illustrating an outline configuration of a manufacturing process flow in the embodiment.

FIG. 17 is a diagram illustrating a manufacturing process flow screen as an example of a display screen of a manufacturing device in the embodiment.

FIG. 18 is a diagram illustrating a first example of a manufacturing process flow in the embodiment.

FIG. 19 is a diagram illustrating a second example of a manufacturing process flow in the embodiment.

FIG. 20 is a diagram illustrating a third example of a manufacturing process flow in the embodiment.

DETAILED DESCRIPTION OF THE INVENTION

Figure 1:
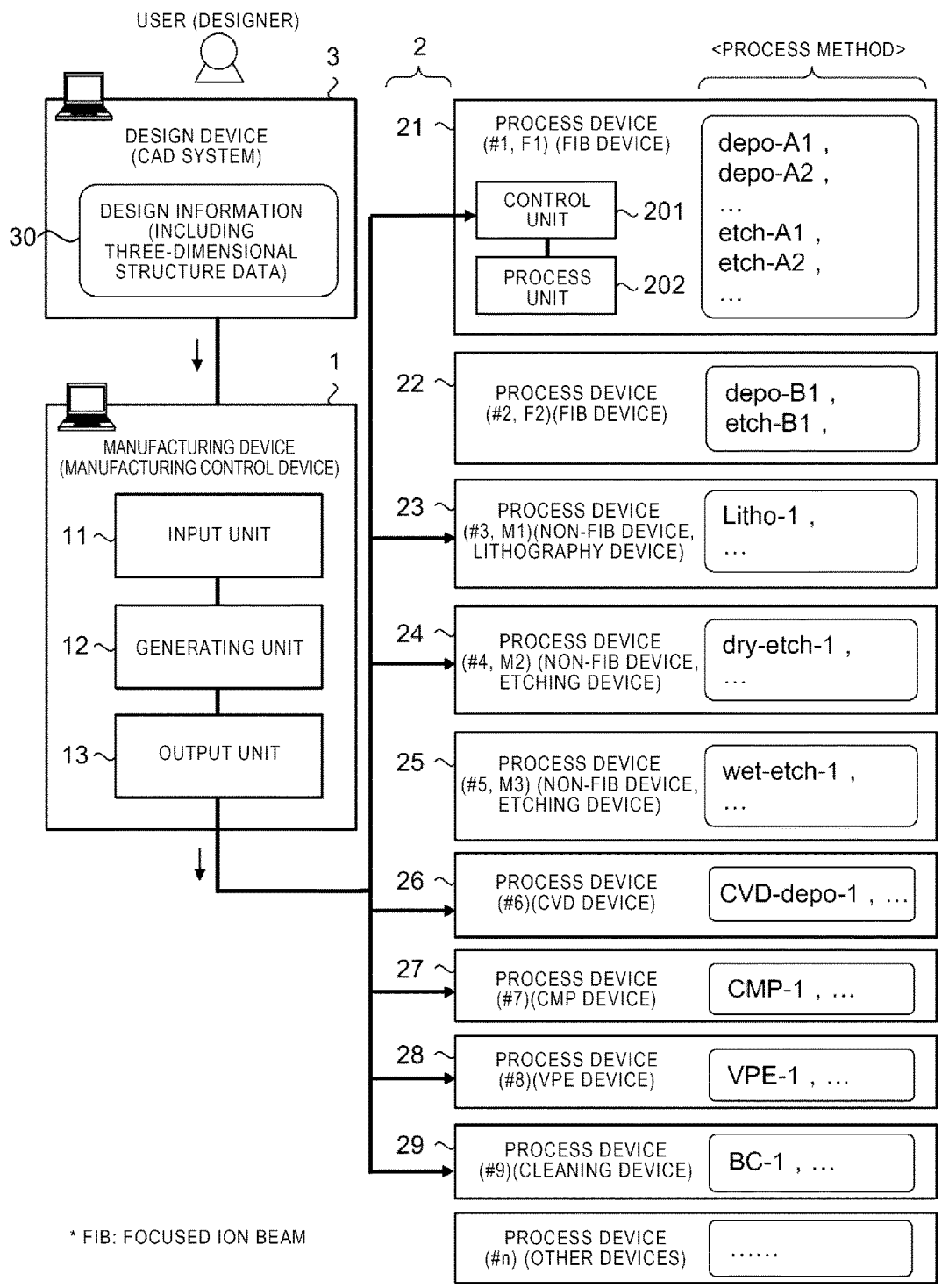
FIG. 1 is a diagram illustrating a configuration of a manufacturing system according to an embodiment of the present invention.

Hereinafter, an embodiment of the present invention will be described in detail based on drawings. In all the drawings for explaining the embodiment, the same reference numerals are attached in principle to the same parts, and a repeated description thereof will be omitted.

Semiconductor Manufacturing Process Method (non-FIB Method)

A background technology will be mainly explained. In a semiconductor manufacturing process method, a photolithography process step includes process steps such as resist application, exposure using a reticle as a photomask, developing, baking, cleaning, and the like. During pattern formation, etching is performed in a case where unnecessary parts of a layer are desired to be removed, and deposition and film formation are performed in a case where necessary parts are desired to add on the layer. Etching may be dry etching or wet etching. In addition, in a case where the photolithography process step is performed, etching includes a resist removal step in a previous step. Deposition and film formation are Chemical Vapor Deposition (CVD), vacuum deposition, and the like.

As one type of dry etching, in Reactive Ion Etching (RIE), electromagnetic waves or the like are applied to etching gas in a reaction chamber to generate plasma, and a high frequency voltage is applied to negative electrode of a sample stage to generate self bias potential between a sample and the plasma. Thus, ion types, radical types, and the like in the plasma are accelerated in the sample direction and collide with each other. At this time, sputtering by the ions and chemical reaction of the etching gas simultaneously occur. Thus, etching with high precision including anisotropic etching can be realized.

Direct Modeling Method (FIB method)

An FIB device has functions of performing etching, deposition, observation, and the like by an FIB method. In the case of performing observation, the FIB device focuses light from a light source through an optical system including a focusing lens or the like and an electric field to form an ion beam, and radiates the beam with a focus of a sample surface through an objective lens or the like. At this time, the FIB device scans the sample surface with the beam by polarization control through a deflector. The FIB device detects secondary electrons generated from the sample surface through a detector. Thus, it is possible to observe a microscopic image of the sample surface.

In a case of performing etching, the FIB device irradiates the sample surface with the ion beam and causes a sputtering phenomenon in which atoms on the sample surface are skipped. Thus, selective etching on an order of nm with respect to the sample surface can be realized without mask process. In etching of the FIB method, a region and a depth of a process target of the sample surface are designated. The FIB device controls the amount of beam or the like and scans the sample surface to perform etching according to this designation.

In a case of performing deposition, for example, in a case of using a direct vapor deposition method, the FIB device deposits a metal on the sample surface as the ion beam. In addition, in a case of using an FIB assistance evaporation method, the FIB device blows gas onto the sample surface with a gas gun and decomposes the gas adsorbed on the sample surface by the ion beam. The decomposed solid component is deposited on the sample surface. Thus, selective deposition on an order of nm with respect to the sample surface can be realized without mask process. In deposition of the FIB method, a region and a height of the process target of the sample surface are designated. The FIB device controls the amount of beam or the like and scans the sample surface to perform deposition according to this designation.

EMBODIMENT

A manufacturing device, a manufacturing system, and a manufacturing method of the embodiment of the present invention will be described with reference to FIGS. 1 to 29.

Manufacturing System

FIG. 1 illustrates a configuration of the manufacturing system according to the embodiment. The manufacturing system of the embodiment includes a manufacturing device 1, a plurality of process devices 2, and a design device 3. These devices are connected with each other through communication means or the like.

The design device 3 may be a CAD system or the like. A user as a designer makes design information 30 including three-dimensional data of a structure. The design device 3 outputs the design information 30 to the manufacturing device 1.

The manufacturing device 1 is a manufacturing device of the embodiment and corresponds to a manufacturing control device of the manufacturing system. The manufacturing device 1 has, as functions realized by a software program process, a manufacturing process flow generating function for generating the manufacturing process flow of the structure or a manufacturing control function for controlling manufacturing according to the manufacturing process flow or the like. The manufacturing device 1 includes an input unit 11, a generating unit 12, and an output unit 13. The input unit 11 inputs the design information 30 including the three-dimensional structure data from the design device 3, constructs the three-dimensional structure data, additional information, and the like based on the design information 30, and inputs the three-dimensional structure data, additional information, and the like to the generating unit 12. The input unit 11 and the output unit 13 provide a screen as a graphical user interface with respect to the user. The generating unit 12 generates the manufacturing process flow based on an input data. The output unit 13 outputs the generated manufacturing process flow to the user on the screen. In addition, the output unit 13 outputs a recipe file or the like to each of the process devices 2 based on the manufacturing process flow.

In addition, the manufacturing device 1 controls start or end or the like of process manufacturing of the structure by exchanging control information with each of the process devices 2. The manufacturing device 1 realizes the manufacturing control function capable of directly and automatically operating and controlling a process operation of each of the process devices 2 based on a recipe of the manufacturing process flow. There is an interface corresponding to the recipe between the manufacturing device 1 and each of the process devices 2.

The plurality of process devices 2 are a device group having a function for performing a process by various process methods corresponding to a process step constituting the manufacturing process flow and includes various process devices as candidates for constituting the manufacturing process flow. The process devices 2 connected by an arrow from the manufacturing device 1 in FIG. 1 respectively illustrate the process devices 2 used for the generated and output manufacturing process flow example. The process devices 2 not connected by the arrow illustrate the process devices 2 not used for the manufacturing process flow example.

The process devices 2 respectively include a control unit 201 and a process unit 202. The control unit 201 controls a drive of the process unit 202 according to the recipe to control the process. The control unit 201 can receive the recipe file from the external manufacturing device 1 as an interface. In a case where the recipe file is input from the manufacturing device 1, the control unit 201 internally sets information such as a control parameter value for each of process methods which is recipe information described in the recipe file. The control unit 201 generates detailed control information for controlling a drive of the process unit 202 according to the set recipe. In a case where a manufacturing execution instruction is input from the manufacturing device 1, the control unit 201 gives the drive control information of the recipe to the process unit 202 to perform the process.

This example includes a process device 21, a process device 22, . . . , a process device 29, and the like as the plurality of process devices 2. The process device 21 is the FIB device as a first process device. The process devices 2 are respectively identified using a process device ID. There are #1 and the like which are numbers as the process device ID. For example, the process device ID of the process device 21 is #1. In addition, a type ID in consideration of a type of the process device 2 is also illustrated. For example, the process device 21 is a first FIB device and the type ID of the process device 21 is F1.

The FIB device as the process device 21 is the process device including functions such as etching, deposition, or the like as a process by the FIB method. The process device 21 includes an etching process method or a deposition process method of the FIB method as a corresponding process method. A plurality of types of process methods may be present in detail. The process device 21 includes the process method identified by a process method ID such as "depo-A1" and "depo-A2" as the deposition process method of the FIB method. The process device 21 includes the process method identified by a process method ID such as "etch-A1" and "etch-A2" as the etching process method of the FIB method. It is possible to select and use different process methods such as "etch-A1" and "etch-A2" of different types.

For each of the process devices 2, it is possible to have various functions corresponding to the process method, and the functions depend on the environment or the like. In a case where a plurality of functions are provided, each of the process devices 2 can process using the process method of the selected function. There is also a case where the process device 2 including a functions corresponding to a new process method is added as updating of the process device 2 and there is also a case where the process device 2 is deleted. There is also a case where the process method is updated by version upgrade of the process device 2. In this way, a configuration of the plurality of process devices 2 in the manufacturing system may be changed in some cases. In the manufacturing system, according to a configuration change, it is possible to handle by updating setting information of the manufacturing device 1.

The process device 22 is a second FIB device and includes #2 and F2 as IDs. In the same manner, the process device 22 includes the functions such as etching or deposition and corresponds to the process method identified by the process method ID such as "depo-B1" and "etch-B1".

An example of the drive control information based on a control parameter of the recipe in the FIB device may be a scanning direction, speed, the amount of beam of FIB or the like. As the FIB device, there may be a device corresponding only to etching or a device corresponding only to deposition.

The process device 23 is a lithography device corresponding to the semiconductor manufacturing process method which is a non-FIB method and includes #3 and M1 as the IDs. The lithography device is the process device including functions such as photolithography as a process of the non-FIB method. The process device 23 corresponds a photolithography process method identified by "Litho-1" or the like as the process method. A plurality of lithography devices may be present.

The process device 24 is a first etching device corresponding to the non-FIB method and includes #4 and M2 as the IDs. The process device 24 particularly corresponds a dry etching process method identified by "dry-etch-1" or the like.

The process device 25 is a second etching device corresponding to the non-FIB method and includes #5 and M3 as the IDs. The process device 25 particularly corresponds a wet etching process method identified by "wet-etch-1" or the like as the process method.

The process device 26 is a CVD device and includes #6 as the ID. The process device 26 corresponds a CVD process method identified by "CVD-1" or the like as the process method.

The process device 27 is a CMP device and includes #7 as the ID. The process device 27 corresponds a CMP process method identified by "CMP-1" or the like as the process method. Chemical Mechanical Polishing (CMP) is one process method for realizing planarization and is the process method for forming a smooth polished surface by chemical mechanical polishing using an abrasive or the like.

The process device 28 is a VPE device and includes #8 as the ID. The process device 28 corresponds a VPE process method identified by "VPE-1" or the like as the process method. Vapor Phase Etching (VPE) is one process method of release and etching.

The process device 29 is a cleaning device and includes #9 as the ID. The process device 29 corresponds a cleaning process method identified by "BC-1" or the like as the process method. Various process devices 2 corresponding to various process methods may be present.

The configuration of the manufacturing system is not limited to the above configuration. For example, the design device 3 and the manufacturing device 1 may be integrated into a single device. In this case, the manufacturing device 1 has a three-dimensional structure data designing function. In addition, the manufacturing process flow generating function and the manufacturing control function of the manufacturing device 1 maybe separated into different devices. In this case, the manufacturing device 1 transmits the generated manufacturing process flow to the manufacturing control device and the manufacturing control device controls the process device 2 according to the manufacturing process flow.

Manufacturing Device

FIG. 2 illustrates a functional block configuration of the manufacturing device 1. The manufacturing device 1 includes a control unit 101, a storage unit 102, an input unit 103, an output unit 104, a communication unit 105, and the like, which are connected with each other via a bus. The input unit 103 receives an input operation by the user. The output unit 104 displays a display screen as an output to the user. The communication unit 105 includes a communication interface and performs a communication process with the process device 2 or the design device 3.

The control unit 101 includes CPU, ROM, RAM, and the like and includes the input unit 11, the generating unit 12, the output unit 13, a management unit 14, and a manufacturing control unit 15 as a processing unit realized by the software program process using the CPU, ROM, RAM, and the like.

The storage unit 102 is configured by a storage or the like and stores three-dimensional structure data 31, additional information 32, a manufacturing process flow 40, a recipe file 41, setting information 60, and the like. The storage unit 102 may be configured by a DB server or the like different from the manufacturing device 1. The three-dimensional structure data 31 is three-dimensional data of a structure of a process manufacturing target. The additional information 32 is information including a material or a flag for each of regions of the structure. The additional information 32 can be set by the user and setting can be omitted. The manufacturing process flow 40 is information including a plurality of ordered process steps, the process method and the process device used in each of the process steps, and the recipe for realizing the process step. The recipe is information including the control parameter value to be given to the process device 2.

The input unit 11 includes a data obtaining unit 11A and an information setting unit 11B. The data obtaining unit 11A collects the design information 30 including the three-dimensional structure data 31 from the design device 3. The information setting unit 11B performs process of setting the additional information 32 to the three-dimensional structure data 31. The input unit 11 displays a menu screen or the like described below on the display screen of the output unit 104 and receives a user input operation.

The generating unit 12 performs a manufacturing process flow generating process illustrated in FIG. 5 described below based on the input design information 30 and the setting information 60, generates the manufacturing process flow 40, and stores the manufacturing process flow 40 in the storage unit 102. There is a case where the generating unit 12 generates a plurality of manufacturing process flows according to a combination of a plurality of process methods or the like during generation process. For this reason, the control unit 101 may include a parallel arithmetic function. The generating unit 12 of the control unit 101 executes generating processes of a plurality of manufacturing process flows in parallel using the parallel arithmetic function.

The output unit 13 includes a flow display unit 13A and a recipe output unit 13B. The flow display unit 13A read the manufacturing process flow 40 generated by the generating unit 12 and performs a process for displaying the manufacturing process flow 40 on the display screen of the output unit 104. The recipe output unit 13B makes the recipe file 41 for outputting to each of the process devices 2 based on the manufacturing process flow 40 and performs a process for outputting the recipe file 41 to each of the process devices 2.

The management unit 14 sets the setting information 60 based on the input operation of the designer or an administrator. Contents of the setting information 60 can be updated according to the configuration change or the like of the manufacturing system as needed. The setting information 60 includes process device setting information 61, process method setting information 62, material setting information 63, flag setting information 64, and rule setting information 65.

The manufacturing control unit 15 controls the plurality of process devices 2 based on the recipe file 41 of the manufacturing process flow 40 to control the process manufacturing of the structure. The manufacturing control unit 15 communicates with the process device 2 and gives the control information to the process device 2.

Operation Flow of Designer

FIG. 3 illustrates an operation flow of the designer in the manufacturing system. The flow in FIG. 3 includes steps S1 to S9. Hereinafter, the steps will be described in order. Step S1b or the like shows a step in a case of a modification example of the embodiment.

(S1) In the design device 3, the designer designs the structure and makes the design information 30 including the three-dimensional structure data 31.

(S2) In the manufacturing device 1, the designer obtains the design information 30 including the three-dimensional structure data 31 on the menu screen from the design device 3. In addition, in the manufacturing device 1, the designer sets the additional information 32 to the three-dimensional structure data 31 on the menu screen.

(S3) In the manufacturing device 1, the designer checks the design information 30 including the three-dimensional structure data 31 and the additional information 32 for input on the menu screen and performs a manufacturing process flow generation executing operation. The manufacturing process flow is generated by the generating unit 12 according to this operation.

(S4) In the manufacturing device 1, the designer checks contents of the manufacturing process flow, which is an optimal first flow generated by the generating unit 12, on a manufacturing process flow screen. The designer can also select the manufacturing process flow equal to or subsequent to a second flow, which is a next candidate, according to a predetermined operation.

(S5) The designer determines whether or not the manufacturing process flow such as the optimal first flow or the like displayed on the manufacturing process flow screen is confirmed. In a case of confirming, a confirming operation is performed. In a case of confirming the optimal first flow, the process proceeds to S6. In a case of partially modifying process steps of this manufacturing process flow, the process proceeds to S7. In a case of modifying the design information 30 such as the three-dimensional structure data, the process is returned to S1 or S2. In a case of modifying the three-dimensional structure data 31, the process is returned to S1. In a case of modifying the additional information 32, the process is returned to S2.

(S6) The designer outputs the recipe file for each of the process devices 2 in the confirmed manufacturing process flow to each of the process devices 2 and sets the recipe to each of the process devices 2.

(S7) The designer manually modifies apart of the process steps of the manufacturing process flow on the manufacturing process flow screen, and the process is returned to S5.

(S8) When the recipe is set to each of the process devices 2, the designer instructs a start of the process manufacturing to start the process manufacturing of the structure.

(S9) According to the manufacturing process flow, the process manufacturing proceeds using each of the process devices 2 and the process manufacturing of the structure is ended. The designer checks the processed and manufactured structure.

(S1b) In a case of the modification example, in the design device 3, the designer makes the three-dimensional structure data 31, sets the additional information 32, and makes the design information 30.

(S2b) In the manufacturing device 1, the designer obtains the design information 30 including the three-dimensional structure data 31 and the additional information 32 from the design device 3. After S2b, the process proceeds to S3.

Process Flow of Manufacturing Device

FIG. 4 illustrates a process flow of the manufacturing device 1. The flow in FIG. 4 includes steps S11 to S24. Hereinafter, the steps will be described in order.

(S11) The input unit 11 of the manufacturing device 1 displays the menu screen illustrated in FIG. 16 described below and obtains the design information 30 including the three-dimensional structure data 31 from the design device 3 according to the user input operation on the menu screen.

(S12) The input unit 11 sets a material, a flag, or the like of the additional information 32 for each of regions of the three-dimensional structure data 31 according to the user input operation on the menu screen. In addition, the input unit 11 sets a group for each of the regions to the three-dimensional structure data 31 according to the user input operation on the menu screen. In addition, the input unit 11 sets a cross section, a direction, and the like to the three-dimensional structure data 31 according to the user input operation on the menu screen.

(S13) The input unit 11 receives designation of the design information 30 including the three-dimensional structure data 31 and the additional information 32 input to the generating unit 12 and receives manufacturing process flow generation executing instruction of the structure according to the user input operation on the menu screen. In addition, when inputting, priority designation of a process time or process accuracy is received through setting or checking of the user. In a case where priority designation is set in advanced, a setting value is used.

(S14) The generating unit 12 expands the design information 30 or the like which is input until S13 to a memory for processing. In addition, the generating unit 12 refers to the process device setting information 61, the process method setting information 62, or the like of the setting information 60.

(S15) The generating unit 12 branches the process according to whether the process time takes priority or the process accuracy takes priority. In a case where the process time takes priority, the process proceeds to S16 and in a case where the process accuracy takes priority, the process proceeds to S22.

(S16) The generating unit 12 performs the manufacturing process flow generating process corresponding to a case of comparison of the process times. Details of this generating process are illustrated in FIG. 5 described below. In this generating process, the generating unit 12 combines the process methods which can be adopted for each of the regions of the structure as an outline and generates branch patterns of the manufacturing process flow. The generating unit 12 performs parallel arithmetic for each of the branch patterns. The generating unit 12 calculates a total process time or the like for each of the branch patterns. The generating unit 12 stores a generated plurality of manufacturing process flows 40 in the storage unit 102 and temporarily holds the manufacturing process flows 40.

An example of the branch pattern is as follows. In a case where the process methods which can be adopted are the plurality of process methods (for example, A and B) such as the etching process method of the FIB method in a first group region, the etching process method of the non-FIB method, branches corresponding to a case of constituting process steps using each of the process methods are created. In addition, in the same manner, in a case where the process methods which can be adopted are the plurality of process methods (for example, C and D) in a second group region ahead of these branches, branches corresponding to a case of constituting process steps using each of the process methods are created again. Patterns are created according to the plurality of branches corresponding to a combination of the applicable process methods. For example, a first branch pattern is a combination of the process methods A and C, a second branch pattern is a combination of the process methods A and D, a third branch pattern is a combination of the process methods B and C, and a fourth branch pattern is a combination of the process methods B and D. A branch pattern which can be applied such as the process method for all regions of the structure becomes one manufacturing process flow. There is a case where different process methods such as the FIB method and the non-FIB method are mixed in one manufacturing process flow.

There are the process methods which can be adopted or the process methods which cannot be adopted according to a configuration of the structure. For example, there is a basic rule of not being able to deposit things on a void, or the like. Such basic rule is also incorporated in processing logic of the generating unit 12.

(S17) The generating unit 12 compares the total process times for the generated plurality of manufacturing process flows 40 and arranges the total process times in the order in which the total process time is short.

(S18) The generating unit 12 sets the manufacturing process flow having the shortest total process time among the generated plurality of manufacturing process flows 40 as the optimal first flow. The output unit 13 displays the optimal first flow on the manufacturing process flow screen illustrated in FIG. 17 described below.

(S19) The output unit 13 confirms the manufacturing process flow used for the process manufacturing according to the user input operation on the manufacturing process flow screen. In addition, the output unit 13 displays the second flow or the like, which is a next candidate, on the manufacturing process flow screen according to the user input operation on the manufacturing process flow screen.

(S20) The output unit 13 makes the recipe file 41 for each of the process devices 2 with respect to the confirmed manufacturing process flow 40. The output unit 13 outputs each of the recipe files 41 based on the user input operation. For example, the output unit 13 respectively transmits the recipe files 41 to the corresponding process devices 2 through the communication means and sets the recipe in each of the process devices 2.

(S21) The output unit 13 controls the process device 2 set by the recipe based on the manufacturing process flow 40 to control the process manufacturing of the structure.

(S22) On the other hand, a case where the process accuracy takes priority is as follows. The generating unit 12 performs the manufacturing process flow generating process corresponding to a case of comparison of the process accuracy. In the same manner as S16, in this generating process, the generating unit 12 combines the process methods which can be adopted for each of the regions of the structure as an outline and generates branch patterns of the manufacturing process flow. The generating unit 12 calculates an index value representing total process accuracy for each of the branch patterns based on a comprehensive calculation of the process accuracy for each of the process steps.

(S23) The generating unit 12 compares the total process accuracy for the generated plurality of manufacturing process flows 40 and arranges the total process accuracy in the order in which the total process accuracy is high.

(S24) The generating unit 12 sets the manufacturing process flow having the highest total process accuracy among the generated plurality of manufacturing process flows 40 as the optimal first flow. The output unit 13 displays the optimal first flow on the manufacturing process flow screen. After S24, the process proceeds to S19.

Manufacturing Process Flow Generating Process

FIG. 5 illustrates a process flow of a manufacturing process flow generating process of the manufacturing device 1 and illustrates a process flow in a case of comparing the process times. The flow in FIG. 5 includes steps S31 to S37. Hereinafter, the steps will be described in order.

(S31) The generating unit 12 sequentially refers to a group region in the three-dimensional structure data 31 in a predetermined cross section or direction (for example, from a bottom to a top in the Z direction). In a case where a cross section or a direction is designated by the designer, the generating unit 12 performs a process according to this designation. The generating unit 12 checks values such as a material and a flag designated as the additional information 32 for each of the group regions.

In S31, although only group regions respectively adjacent to the group regions of the three-dimensional structure data 31 may be sequentially referred, it may be referred to as follows. In S31, first, the whole regions of the three-dimensional structure data 31 may be scanned based on a region connection relationship, a group ID, and the like and an order of the group regions for referring as the branch pattern may be made.

(S32) The generating unit 12 applies the process method, which is a candidate able to be adopted, as a process step and makes the branch pattern for each of the group regions. The process method to be adopted is set in association with the process device or the like in the setting information 60. The generating unit 12 performs a generating process for giving a process step number or the like to each of the process steps and the group regions of the branch pattern.

In a case where a material is designated in the additional information 32, the generating unit 12 applies the process method corresponding to the material to the group region. In addition, in a case where a flag is designated in the additional information 32, the generating unit 12 applies the process method corresponding to this flag to the group region.

The generating unit 12 automatically adds the process method of the process step based on the rule setting information 65 according to the process method applied by the process step of the group region. For example, in a case of being applied a predetermined etching process step, a pre-determined cleaning process step is automatically added as a next process step.

(S33) The generating unit 12 makes the recipe for the process step of each of the group regions in the branch pattern. That is, as a recipe, the control parameter value and the like corresponding to the process device 2 and the process method used in the process step are determined.

(S34) The generating unit 12 calculates the process time required for the process step based on the process method setting information 62 and the like according to the recipe of the process step of each of the group regions.

(S35) The generating unit 12 refers to a next group region based on the connection relationship of the group region in the three-dimensional structure data. In a case where there is the next group region, the process is returned to S31 and repeats in the same manner. In a case where process steps and the like are already generated with reference to all the group regions of the three-dimensional structure data and a case where, that is, the process is reached to an end of the branch pattern, the process proceeds to S36 by the generating unit 12.

(S36) The generating unit 12 calculates the total process time for the manufacturing process flow of each of the branch patterns. The generating unit 12 calculates the total process time by a comprehensive calculation of the process time for each of the process steps, for example, adding.

(S37) The generating unit 12 gives header information such as a manufacturing process flow ID to the manufacturing process flow of each of the branch patterns, makes the header information as a manufacturing process flow table, and stores the table in the storage unit 102.

The manufacturing process flow generating process in a case of process accuracy comparison can also be realized in the same manner as described above. In this case, in S34, the generating unit 12 calculates the process accuracy of the process step based on the process method setting information 62 and the like according to the recipe of the process step of each of the group regions.

Process Device Setting Information

FIG. 6 illustrates a configuration and a setting example of the process device setting information 61. A table of the process device setting information 61 includes, as a column, the process device ID, a type, process method classification, the process method ID, and a recipe control parameter and these are set in association with each other. The process device ID shows an ID of the process device 2. The type shows a type such as the FIB method or the non-FIB method. The process method classification shows classification regarding the process method. The process method ID shows an ID of the process method. The recipe control parameter shows the control parameter of the recipe corresponding to the process method and the process device.

For example, a first line shows a setting value regarding the process device 21 which is the FIB device. The process device 21 of which the type is FIB corresponds to the plurality of process methods such as "depo-A1" process method as the deposition process method or "etch-A1" process method as the etching process method. The control parameter is defined for each of the process methods. For example, "depo-A1" process method includes a plurality of control parameter such as control parameters pDA11 and pDA12. In the same manner, information is set for each of the process devices 2.

Process Method Setting Information

FIG. 7 illustrates a configuration and a setting example of the process method setting information 62. In a table of the process method setting information 62, information for calculating the process time, the process accuracy, or the like is set to each of the process methods. In a table of the process method setting information 62, the process accuracy, a process rate, and the like are set to each of the process methods and each of the material in association with each other. This table includes the process method, the process method classification, the process device, the material, the process accuracy, the process rate, and a process time setting value, as a column. A column of "process method" shows the process method ID. A column of "process method classification" shows classification of the process method. A column of "process device" shows the process device ID of the process device 2 having a function corresponding to the process method. A column of "material" shows a material which becomes the process target and the candidate in the process method.

A column of "process accuracy" shows process accuracy value in a case of performing a process or the like in the process method and shows maximum value of deviation. A unit of the process accuracy is, for example, [nm] or the like.

A column of "process rate" shows a process rate in a case of performing a process or the like in the process method and shows a process region size per a unit time. A unit of the process rate is, for example, [nm/min] or the like. The process region size is a unit according to the process method such as a distance, a surface region, and a volume.

A column of "process time setting value" shows a constant value in a case of setting the constant value as the setting value of the process time in a case of performing a process or the like in the process method. For example, in a case of a cleaning step of a cleaning method, since the process time is almost the same regardless of the process region size, a constant value is set.

A first line shows a setting example regarding "etch-A1" process method which is etching of the FIB method. In this process method, "FIB-etching" is set as the process method classification and #1 and #2 are associated with each other as IDs of the corresponding process devices. Si, SiO, SiN, and the like are set for each of lines as a material handled in this process method, and the process rate and the like are set in each of the cases.

A second line shows a setting example regarding "dry-etch-1" process method which is etching of the non-FIB method, particularly dry etching (RIE). "etching, dry, and RIE" are set as the process method classification. A third line shows a setting example regarding "wet-etch-1" process method which is etching of the non-FIB method, particularly wet etching. "etching, wet, and release" are set as the process method classification. A fourth line shows a setting example regarding "VPE-1" process method. "release and etching" are set as the process method classification. A fifth line shows a setting example regarding "BC-1" process method which is the cleaning method. "cleaning" is set as the process method classification and a constant value c1 is set as the process time setting value.

The process time for each of the process steps using the process method according to the material can be calculated using the process region size and the process rate. [process region size]/[process rate]=[process time]. In addition, the total process time of the whole manufacturing process flows can be calculated by the comprehensive calculation of the process time of each of the process steps, for example, adding. The process method setting information 62 may be integrated into the process device setting information 61. In addition, it is also possible to calculate the process time in the same manner using a setting value of the necessary process time per a unit region or the like instead of the process rate.

Material Setting Information

FIG. 8 illustrates a configuration and a setting example of the material setting information 63. In a table of the material setting information 63, various materials which can be selectively designated by the user are set. In this table, for example, a material of a material value m1 is Si (silicon), a material of a material value m2 is SiN (silicon nitride), and a material of a material value m3 is $SiO_2$ (silicon oxide).

The material is not only a substance such as Si, but also a void, air, vacuum, or the like. The material can be selectively designated. It is substantially possible to control and adjust quality and accuracy of the structure by the designer designating a material according to the regions of the structure.

Flag Setting Information

FIG. 9 illustrates a configuration and a setting example of the flag setting information 64. In a table of the flag setting information 64, various flags which can be selectively designated by the user are set. As a flag value, the process device and the type of the process device setting information 61, the process method classification and the process method of the process method setting information 62, or the like can be designated. In this table, for example, a flag value f0="i" shows an initial process, that is, a non-process. A flag value f1="d" shows deposition. A flag value f2="e" shows etching. A flag value f3="r" shows release. A flag value f4="p" shows planarization. The flag values f1 to f4 are designation examples of the process method classification. A flag value f11 shows "depo-A1" process method. A flag value f12 shows "dry-etch-1" process method. A flag value f13 shows "VPE-1" process method. The flag values f11 to f13 are designation examples of the process method. A flag value f21 shows the process device 21 in which the process device ID=#1 (F1) and is a designation example of the process device 2.

As the modification example, the flag value may also designate whether the process time takes priority or the process accuracy takes priority for each of the regions. For example, in a case where the process time takes priority in the whole structure, it is possible to designate that the process accuracy takes priority in the flags of only a part of the regions. The generating unit 12 calculates the process accuracy of the process step for a part of the regions according to the flags.

Rule Setting Information

FIG. 10 illustrates a configuration and a setting example of the rule setting information 65. In a table of the rule setting information 65, rules regarding process steps in order are set. These rules particularly includes a setting of rules to be used when automatically adding process steps. This table includes, as a column, a process method process step, a pre-process step process method, and a post-process step process method. The rules are shown for each of lines. A column of "process step process method" shows the ID of the process method of the process step. For example, "BC-1", "BC-2", "FC-1", "FC-2", and the like are shown. "BC-1" (Backside Cleaning-1) shows one of backside cleaning process methods. "FC-1" (Frontside Cleaning-1) shows one of frontside cleaning process methods.

A column of "pre-process step process method" shows the process method ID of the process method of one pre-process step which is associated with the process step and the process method of the column of "process step process method" and a column of "post-process step process method" shows the process method ID of the process method of one post-process step. As an example of the rule, "depo-1" process method of the pre-process step and "Litho-1" process method of the post-process step are set to "BC-1" process method. This rule shows that in a case where the pre-process step is "depo-1" process method and the post-process step is "Litho-1" process method, a process step of "BC-1" process method is automatically added between the pre-process step and the post-process step. This rule shows that backside cleaning is performed after a deposition process step, then the photolithography process step is performed.

In the same manner, as an example of the rule, "etch-1" process method of the pre-process step and "depo-1" process method of the post-process step are set to "BC-1" process method. This rule shows that in a case where the pre-process step is "etch-1" process method and the post-process step is "depo-1" process method, a process step of "BC-1" process method is automatically added between the pre-process step and the post-process step. In the same manner, as an example of the rule, "etch-1" process method of the pre-process step and "depo-1" process method of the post-process step are set to "FC-1" process method. This rule shows that in a case where the pre-process step is "etch-1" process method and the post-process step is "depo-1" process method, a process step of "FC-1" process method is automatically added between the pre-process step and the post-process step.

Manufacturing Process Flow

FIG. 11 illustrates a configuration outline of the manufacturing process flow 40. In a table of the manufacturing process flow 40, information for each of the process steps in the plurality of process steps in order is set to each of lines. The table of the manufacturing process flow 40 includes information such as the manufacturing process flow ID, a structure ID, created date, the total process time, and the total process accuracy as the header information. In a case where the process time takes priority, the manufacturing process flow includes information of the total process time and in a case where the process accuracy takes priority, the manufacturing process flow includes information of the total process accuracy.

The table of the manufacturing process flow 40 includes the process step, a process target region, the process device, the process method classification, the recipe, the process time, and the process accuracy as a column. A column of "recipe" includes the process method and the control parameter value as a further column.

Generation of Process Step in Case of Etching of FIB Method

Figure 12:
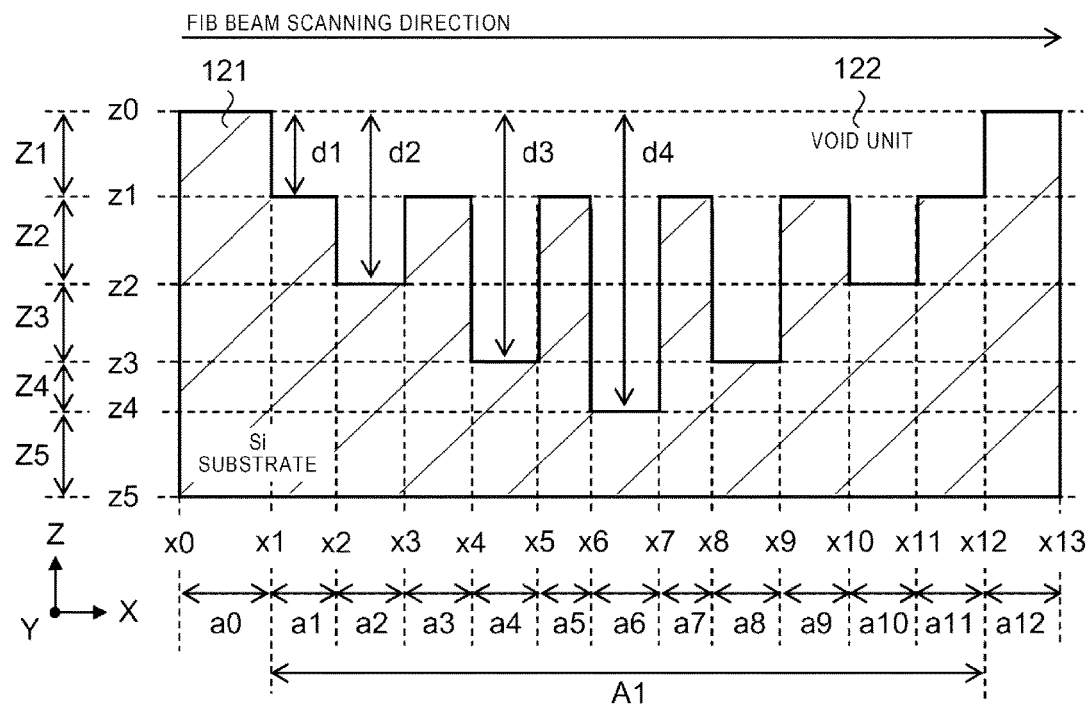
FIG. 12 is an explanatory diagram regarding generation of process steps in a case of an FIB method and etching in the embodiment.

FIG. 12 illustrates generation of a process step in a case of etching of the FIB method. For an explanation, (X, Y, and Z) are illustrated as a rectangular coordinates system and directions of the rectangular coordinates system. An X-Z cross section of the three-dimensional structure data 31 of an example is illustrated. The example of the structure includes a Si substrate unit 121 and a void unit 122. The void unit 122 is a groove portion having unevenness formed on an upper surface of a Si substrate. The void unit 122 includes a depth d1 in Z direction in a region of a range A1 from a position x1 to a position x12 in the X direction and a range Z1 from a position z0 to a position z1 in the Z direction. The void unit 122 includes a depth d2 from a position z0 to a position z2 in a range a2 from a position x2 to a position x3 and a range a10 from a position x10 to a position x11. The void unit 122 includes a depth d3 from a position z0 to a position z3 in a range a4 from a position x4 to a position x5 and a range a8 from a position x8 to a position x9. The void unit 122 includes a depth d4 from a position z0 to a position z4 in a range a6 from a position x6 to a position x7.

In a case where this structure is formed using the etching process method of the FIB method of the FIB device, a following process step is generated. For example, "etch-A1" process method of an FIB device 21 is used. A beam of FIB is scanned from above in the Z direction of this X-Z cross section to an X-Y plane. A scanning direction of the beam is referred to as the X direction. The same process is performed in the Y direction. A range of the X direction and Y direction, a process depth, and the like are determined as the control parameter value of the recipe. The control parameter values are determined to be the depth d1 in ranges a1, a3, a5, a7, a9, and a11, the depth d2 in the ranges a2 and a10, the depth d3 in the ranges a4 and a8, and the depth d4 in the range a6.

The process time of each of the ranges is calculated using a process rate. In the ranges a1, a3, a5, a7, a9, and a11, a process time t01 is obtained from the depth d1. In the same manner, in the ranges a2 and a10, a process time t02 is obtained from the depth d2. In the ranges a4 and a8, a process time t03 is obtained from the depth d3. In the range a6, a process time t04 is obtained from the depth d4. The process time of the process step of this structure is obtained by adding, for example, the process times t01 to t04.

Even in a case of deposition of the FIB method, it is possible to generate process steps in the same manner as above. It is possible to calculate the process time according to the ranges and process heights.

In the FIB method, it is possible to perform a process such as etching while selectively changing the process depth for each of the ranges along with beam scanning in the X direction or the like. In the FIB method, it is possible to designate position coordinates, the process depth, the process height, and the like of a region range to be irradiated with beam as the control parameter value regarding beam scanning. For this reason, in the FIB method, the processes of the structure described above can basically be realized as one process step. It is possible to calculate the process time based on the surface region or the like of a bean process region.

Generation of Process Step in Case of Etching of non-FIB Method

Figure 13:
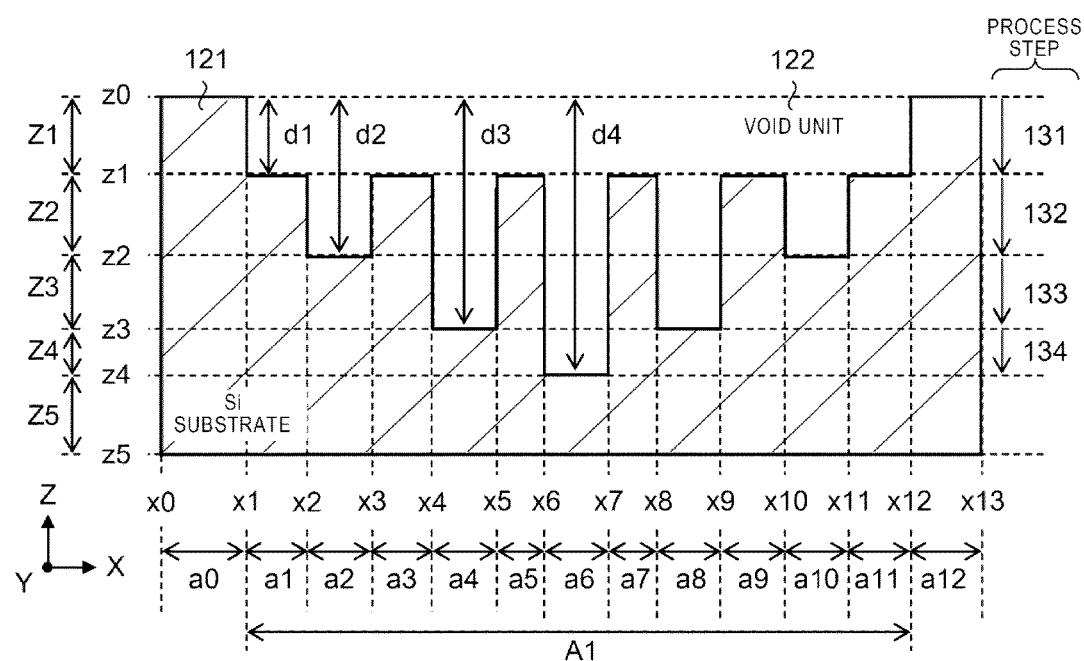
FIG. 13 is an explanatory diagram regarding generation of process steps in a case of a non-FIB method and etching in the embodiment.

FIG. 13 illustrates generation of a process step in a case of etching of the non-FIB method. An X-Z cross section of the three-dimensional data of the same structure as FIG. 12 is illustrated. In a case where this structure is formed using the etching process method of the non-FIB method of a non-FIB device, a following process step is generated. For example, "Litho-1" process method of the process device 23, "dry-etch-1" process method of the process device 24, or the like is used.

Process steps of the non-FIB method are generated as a process step for each of divided layers. The generating unit 12 divides a region of the void unit 122 in the Z direction to a plurality of layers according to a depth. That is, there are a range Z1, a range Z2, a range Z3, and a range Z4 as the divided layers. The process step are generated for each of the divided layers. That is, there are a process step 131 of the range Z1, a process step 132 of the range Z2, a process step 133 of the range Z3, and a process step 134 of the range Z4.

The process step 131 is a process step for performing photolithography, etching, cleaning, and the like in the range Z1 in the Z direction and a range A1 in the X direction. The process step 132 is the same process step in the range Z2 and ranges a2, a4, a6, a8, and a10 in the X direction. The process step 133 is the same process step in the range Z3 and the ranges a4, a6, and a8 in the X direction. The process step 134 is the same process step in the range Z4 and the range a6 in the X direction. Process times of the process steps for the divided layers are respectively T01 to T04. The process time of the process step of this structure is obtained by adding, for example, the process times T01 to T04.

A detailed example of the process step for each of the division layers is as follows. There are a first process step p1, a second process step p2, a third process step p3, a fourth process step p4, and a fifth process step p5 as the process steps for the divided layers. The first process step p1 is a step for performing resist application or the like as a first lithography step and is performed using, for example, "Litho-1" process method or the like of the process device 23 which is the lithography device. The second process step p2 is a step for performing exposure or the like using a reticle as a second lithography step and is performed using, for example, "Litho-1" process method or the like of the process device 23 which is the lithography device. The third process step p3 is a step for performing developing/baking or the like as a third lithography step and is performed using, for example, "Litho-1" process method of the process device 23 which is the lithography device.

The fourth process step p4 is an etching step, and dry etching (RIE) is performed using, for example, "dry-etch-1" process method of the process device 24. The fifth process step p5 is a cleaning step, and cleaning is performed using, for example, "BC-1" process method of the process device 29 which is the cleaning device. It is possible to automatically add process steps such as application, exposure, developing/baking, and cleaning based on designation of the etching process step in the fourth process step p4 and the rule setting information 65.

Process times of these process steps are respectively tp1 to tp5. The process time is calculated using a process rate. For example, the process time tp4 of the fourth process step p4 is obtained according to a material, a process region size, and the process rate of etching. For example, in the process step 131, the process time tp4 is obtained according to a surface region or a volume of the range Z1 and the range A1. In addition, the process times tp1, tp2, tp3, and tp5 of the first process step p1, the second process step p2, the third process step p3, and the fifth process step p5 are obtained as the process time setting value of the process method setting information 62 regardless of the process region size. The process time of the process step of the divided layer is obtained by adding, for example, the process times tp1 to tp5.

A number of process steps necessary for process the above structure is, for example, repeated for each of the divided layers with the five process steps p1 to p5 for each of the divided layer as one set, and multiplication thereof by 5×4=20.

Even in a case of deposition of the non-FIB method, it is possible to generate process steps in the same manner as above. It is possible to calculate the process time for each of the divided layers according to process heights.

In the above example, it is assumed that a mask removal step, a recipe thereof, and the like are included in the etching process method and a recipe thereof. Various process methods can be set without being limited thereto. In addition, it is possible to automatically add the mask removal step or the like according to a setting of the rule setting information 65.

Three-dimensional Structure Image

Figure 14:
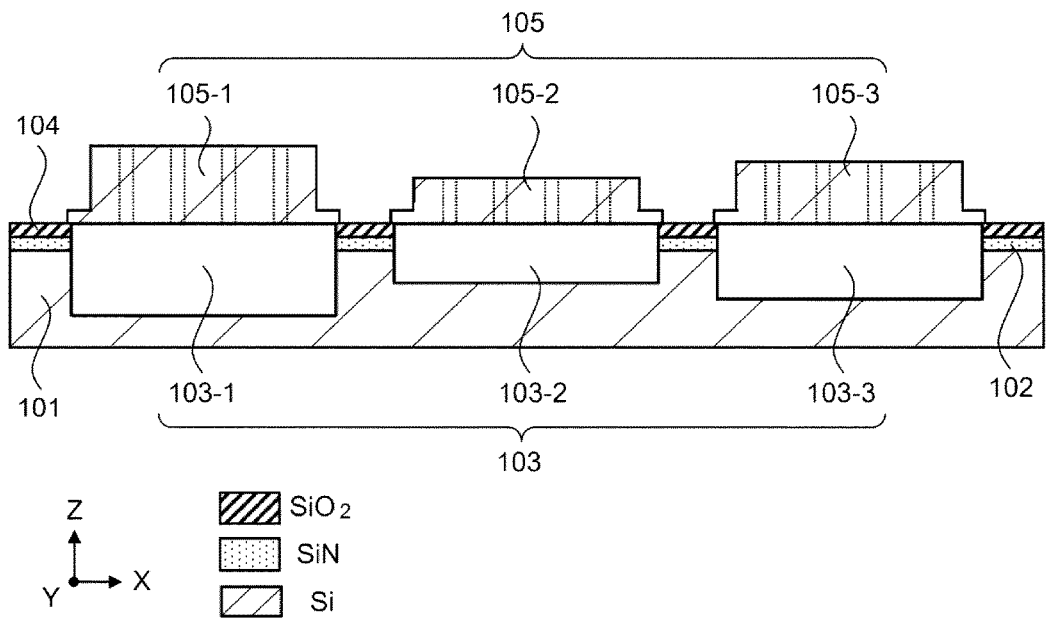
FIG. 14 is a diagram illustrating an X-Z cross section of a three-dimensional image of an example of a structure in the embodiment.

FIG. 14 illustrates an X-Z cross section of a three-dimensional image of an example of a structure of a manufacturing target. This structure includes a region 103 of three cavity portions in an X-Y plane of a main substrate and includes a region 105 of three structure portions so as to cover on the region 103 of these cavity portions as a shape outline. The main substrate is formed of a plurality of layers of a region 101 of Si, a region 102 of SiN, and the region 103 of $SiO_2$ as a material in order from a lower side in the Z direction. The region 103 of the three cavity portions includes a region 103-1, a region 103-2, and a region 103-3 in the X direction in order from a left side, and depths in the Z direction are different from each other. The region 105 of the three structure portions includes a region 105-1, a region 105-2, and a region 105-3 in the X direction in order from a left side, and heights in the Z direction are different from each other. The region 105 of the structure portion is formed of Si and provides a plurality of holes penetrating in the Z direction.

Three-dimensional Data and Additional Information of Input Structure

Figure 15:
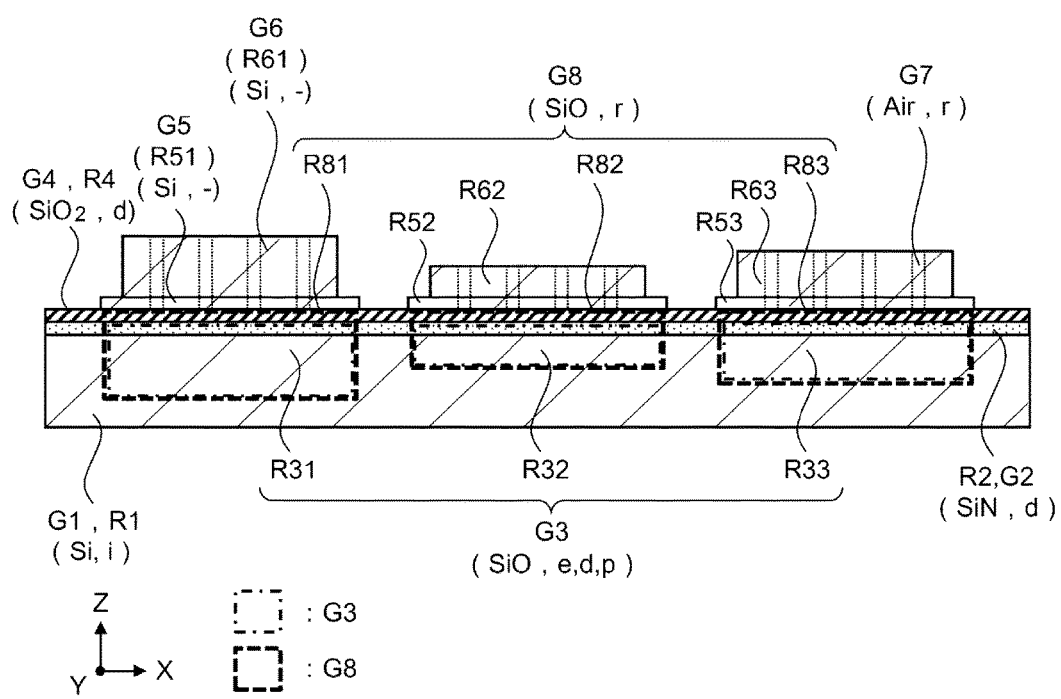
FIG. 15 is a diagram illustrating an X-Z cross section of an example of three-dimensional data of an input structure in the embodiment.

FIG. 15 illustrates an X-Z cross section of an example of the three-dimensional structure data 31 and the additional information 32 regarding to the structure in FIG. 14. The whole structure is classified into groups and regions. Each of the regions is also set as a group. The region in which the group is set is also referred to as a group region.

In each of the regions, a region ID and a group ID are set. R1 and the like show region IDs. G1 and the like show group IDs. In a case where regions of the same type are treated a plurality of divided regions, the same group is set in these the plurality of regions. In addition, a material and a flag can be set in each of the regions. Materials and flags are showed in parentheses of the region ID and the like.

For example, in the region 101 corresponding to the Si substrate in FIG. 14, the region R1 and the group G1 are set, Si is set as a material, and "i" is set as a flag value. In a region 102, a region R2 and a group G2 are set, SiN is set as a material, and "d" is set as a flag value. In a region 104, a region R4 and a group G4 are set, $SiO_2$ is set as a material, and "d" is set as a flag value.

In a region 103, regions R81, R82, and R83 and a group G8 are set, SiO is set as a material, and "r" is set as a flag value as illustrated by dotted line frame. In addition, in a region 103, regions R31, R32, and R33 and a group G3 are set, SiO is set as a material, and "e, d, and p" are set as flag values as illustrated by one-dotted line frame. A position of an upper surface of a region of the group G8 is up to an upper surface of a region R4 and a position of an upper surface of a region of the group G3 is up to an upper surface of a region R2. The group G8 and the group G3 are set in consideration of a process for forming the cavity portion.

The region 105 is divided into two groups according to a difference between ranges in the X direction. In the region 105, regions R51 to R53 and a group G5 and regions R61 to R63 and a group G6 are set. The regions R51 to R53 of the group G5 are in contact with tops of a region R4, the region R81, and the like. The regions R61 to R63 of the group G6 are in contact with tops of the regions R51 to R53. In the group G5 and the group G6, Si is set as a material, and the flag value is not set (illustrated by "–").

In addition, in regions of the group G5 and the group G6, a region of a group G7 corresponding to a plurality of holes is set. The region ID may be set and only the group ID may be set to each of the holes. In the region of the group G7, air is set as a material, and "r" is set as a flag value.

Screen Example (1)—Menu Screen

Figure 16:
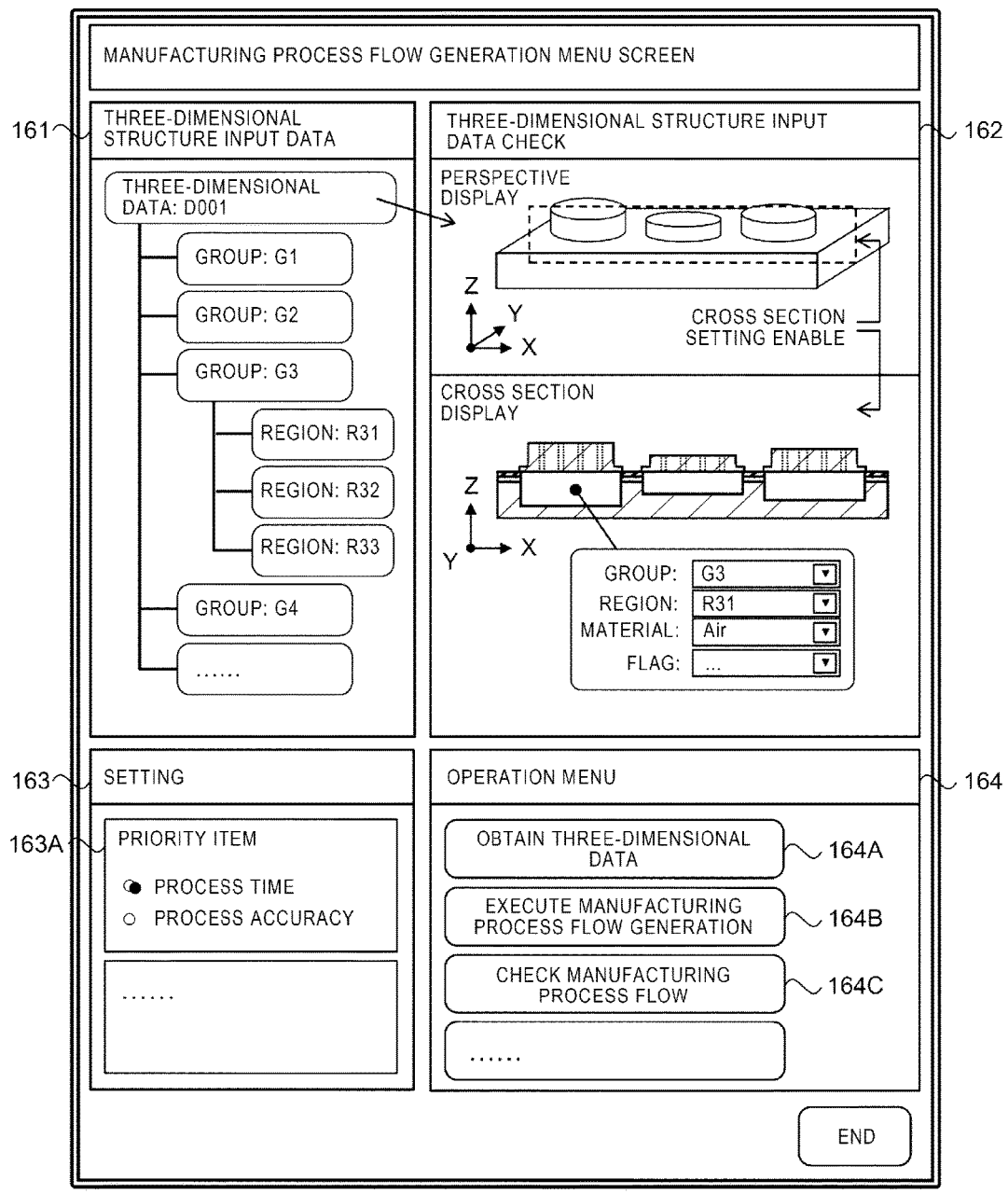
FIG. 16 is a diagram illustrating a menu screen as an example of a display screen of a manufacturing device in the embodiment.

FIG. 16 illustrates a menu screen regarding a manufacturing process flow generating function as an example of a first display screen of the manufacturing device 1. This menu screen includes a three-dimensional structure data input screen or the like. This menu screen includes a three-dimensional structure input data field 161, a three-dimensional structure input data check field 162, a setting field 163, and an operation menu field 164 as fields.

The three-dimensional structure input data field 161 displays a configuration which includes groups and regions of three-dimensional data of a target structure with a tree structure. A user can select items such as the three-dimensional data, the group, the region and contents of the selected item is expanded in a tree structure. For example, when the user selects a group G3 item, regions constituting the group G3 are expanded such as the regions R31 to R33.

The three-dimensional structure input data check field 162 performs a perspective display or a cross section display to groups or regions of the three-dimensional data or a part of the three-dimensional data selected by the three-dimensional structure input data field 161. Thus, the user can check a three-dimensional configuration or a two-dimensional configuration of the input structure. The three-dimensional structure input data check field 162 includes a perspective display field and a cross section display field.

In the perspective display field, for example, a whole structure of selected three-dimensional data D001 is perspectively displayed in a coordinate system of (X, Y, and Z). Here, the X direction and the Y direction are two orthogonal directions constituting a horizontal plane, and the Z direction is a vertical direction. A coordinate system and a direction corresponding to the structure can also be set by the user. In the perspective display field, it is also possible to set and designate a cross section to be input to the generating unit 12 according to the user operation.

In the cross section display field, a cross section of the structure is displayed. In this example, an X-Z cross section is displayed as the cross section designated by the user in the perspective display field. It is possible to speed up the manufacturing process flow generating process of the generating unit 12 by designation of a cross section or a direction. In a case where there is no designation of the input cross section or the like, the generating unit 12 performs a process of automatically determining each of cross sections and directions.

In addition, in the cross section display field, it is possible to check and set additional information such as a group and a region, a material, and a flag of the structure according to the user operation. For example, when the user selects a region of the structure, setting items and current setting values such as the group, the region, the material, and the flag are displayed in a pop-up region or the like. The user can select from choices and set values in the setting items.

In the setting field 163, various user settings regarding a function of this manufacturing system can be performed. There is a priority item 163A as a setting item. In the priority item 163A, it is possible to select an item to be taken priority and set the item when generating the manufacturing process flow. There are a process time and process accuracy as priority items. In this priority items, the user can select and set the process time or the process accuracy in advance. When the manufacturing process flow generating process, a process is performed according to the process time or the process accuracy set in these items. A form in which the user inputs the process time or the process accuracy every manufacturing process flow generating process may be adopted.

In the operation menu field 164, it is possible to perform an instruction input of the user to the manufacturing system by a selection input operation such as a button. In this example, the operation menu field 164 includes an "obtain three-dimensional data" button 164A, an "execute manufacturing process flow generation" button 164B, a "check manufacturing process flow" button 164C, and the like. The "obtain three-dimensional data" button 164A is used in a case of obtaining the design information 30 including the three-dimensional structure data 31 from the cooperating design device 3. When the button is pressed, the user can designate a file to be obtained, and then the designated file is transferred from the design device 3 to the manufacturing device 1.

The "execute manufacturing process flow generation" button 164B is used in a case where the three-dimensional structure data 31 and the additional information 32 checked on the screen are input to the generating unit 12 to execute the manufacturing process flow generation. The "check manufacturing process flow" button 164C is used in a case where there is the generated and stored manufacturing process flow when the user checks the contents.

Screen Example (2)—Manufacturing Process Flow Screen

FIG. 17 illustrates a manufacturing process flow screen as an example of a second display screen of the manufacturing device 1. In this screen, contents of the manufacturing process flow generated by the generating unit 12 are displayed and the user can check and modify the contents of the manufacturing process flow. The screen includes a manufacturing process flow header field 171, a manufacturing process flow field 172, and an operation menu field 173.

The manufacturing process flow header field 171 displays the header information of the manufacturing process flow. As illustrated in FIG. 11, the header information includes the manufacturing process flow ID, a three-dimensional structure data ID (for example, file name), the created date, the total process time, and the like.

The manufacturing process flow table is displayed in the manufacturing process flow field 172. The optimal first flow is displayed in the manufacturing process flow field 172 immediately after the generating process of the generating unit 12. In a case where the process time takes priority, the optimal first flow is the manufacturing process flow having shortest total process time. The manufacturing process flow table of the manufacturing process flow field 172 also provides buttons for modification in each line of the process steps. In a case of modifying the process step, the user presses the button for modification. Thus, a pop-up region or a field for modification of the process step is displayed. It is possible for the user to modify the contents of the process step and to add or delete the process step in the region or field.

Buttons for the user input operation regarding the manufacturing process flow are displayed in the operation menu field 173. In this example, the operation menu field 173 includes a "confirm (recipe file output)" button 173A, a "next candidate flow display" button 173B, and a "three-dimensional data modification (rejection)" button 173C. The "confirm (recipe file output)" button 173A is used in a case of confirming use of the manufacturing process flow displayed on the screen. When this button is pressed, the manufacturing process flow is stored and a recipe file corresponding to the manufacturing process flow is automatically output. That is, the recipe files 41 respectively corresponding to the process devices 2 of the process steps of the manufacturing process flow are respectively output. A method of outputting the recipe file 41 can be changed according to a setting by the user. For example, first, each of the recipe files 41 and the control information are transmitted from the manufacturing device 1 to each of the process devices 2 through the communication means such as LAN and are set in the process devices 2. Alternatively, second, each of the recipe files 41 is output to an external storage device (for example, a card corresponding to USB or the like) of the manufacturing device 1. The user carries the external storage device, mounts the external storage device on the process device 2, and sets the recipe file 41 of the external storage device to the inside process device 2.

In a case of displaying a manufacturing process flow of the next candidate on the screen, the "next candidate flow display" button 173B is used. When this button is pressed in a state where the optimal first flow is displayed, the second flow, which is a next optimal candidate, is displayed on the screen. A button or a field may be provided for the user to freely select and display from a list of the generated plurality of manufacturing process flows.

In a case where the manufacturing process flow of the screen is rejected without confirming and the design information 30 such as the three-dimensional structure data is modified to restart generation of the manufacturing process flow, the "three-dimensional data modification (rejection)" button 173C is used. The user reviews design of the structure and modifies the three-dimensional structure data 31 or the like based on a check of contents of the manufacturing process flow of the screen. When this button is pressed, the process is returned to the menu screen and the user obtains the modified three-dimensional structure data 31, modifies the additional information 32, or the like. The user regenerates the manufacturing process flow by the "execute manufacturing process flow generation" button 164B using modified data.

Manufacturing Process Flow Generation

In the manufacturing system of the embodiment, a generation example of a manufacturing process flow in a case of manufacturing the structure as illustrated in FIG. 14 is as follows. The generating unit 12 performs the manufacturing process flow generating process in FIG. 5 based on the three-dimensional structure data 31 and the additional information 32 in FIG. 15. As a result, the plurality of manufacturing process flows having the manufacturing process flow of a first example as illustrated in FIG. 18 are generated.

Manufacturing Process Flow Generation Example (1)

FIG. 18 illustrates the first example of the manufacturing process flow generated by the generating unit 12. This first example is an optimal first flow generated in a case where the process time takes priority. This first example is particularly a case where the process method of the FIB method for a process step of the regions R31 to R33 of the group G3 is adopted to shorten the process time. The process time and the like are not illustrated in the manufacturing process flow in FIG. 18 and the like.

A table of the manufacturing process flow in FIG. 18 approximately includes an input column and an output column. The input column includes a three-dimensional input data ID, coordinates data, a material, and a flag. The output column includes the process step number, the process device, and the recipe. "three-dimensional input data ID" is an ID for each of regions in the three-dimensional structure data and is one of a group ID or a region ID. The group ID and the region ID are associated with each other. "coordinates data" illustrates coordinates data defining the region of this three-dimensional data. "material" is a material set to this region. A value selected by the material setting information 63 can be set to the material. A void may be set as a default value for the material not designated. "flag" illustrates a flag set to the region. A value selected by the flag setting information 64 can be set to the flag. Non-flag "–" may be set as a default value for the flag not designated.

"process step number" is an ID of the process step and is P1 or the like in this example. The process step numbers are ordered. "process device" is an ID of the process device 2 used for the process step of the process step number and is a value selected by the process device setting information 61. "recipe" includes the ID of the process method used for the process step and the process device, the material used for the process method, and the control parameter value not illustrated. The process method ID is a value selected by the process device setting information 61.

FIGS. 21 to 28 illustrate X-Z cross sections in process states of the structure in each of the process steps corresponding to the manufacturing process flows of the first example in FIG. 18. Hereinafter, configurations of the manufacturing process flows of the first example in FIG. 18 will be described with reference to FIGS. 21 to 28.

Figure 21:
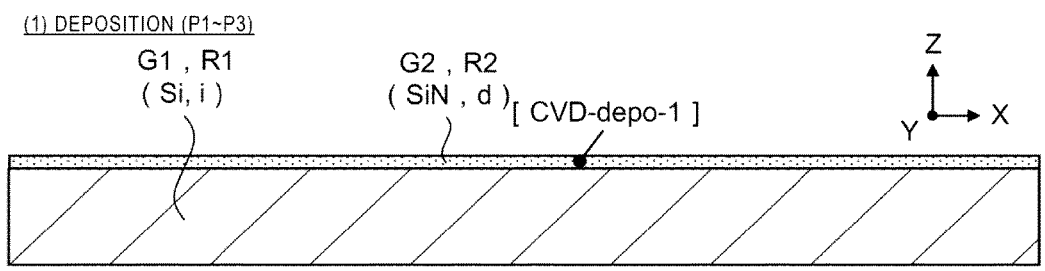
FIG. 21 is a diagram illustrating a first example of a cross section of process steps in the embodiment.

(1) FIG. 21 illustrates process steps of deposition or the like corresponding to a first process step to a third process step. The Si substrate is disposed in a region R1. A silicon nitride film of SiN is film-formed as a region R2 on the region R1.

The first process step indicated by the process step number=P1 is a step of disposing the Si substrate in the region R1 of a group G1 as illustrated in FIG. 21. Since a process is not particularly necessary, a flag value is "i" representing an initial state in the first process step. The generating unit 12 provides the first process step in which a process using the process device 2 is not performed according to the flag value is "i".

As illustrated in FIG. 21, the second process step illustrated in P2 is a step in which the silicon nitride film of SiN is film-formed by deposition in the region R2 of a group G2. According to the flag value="d", a process method, of which the process method classification is deposition, is selected. In the second process step, "CVD-depo-1" process method of the process device 26, which is the CVD device, is used as deposition of the non-FIB method.

The third process step illustrated in P3 is a step which is automatically added after the second process step based on the rule setting information 65 and a step in which cleaning is performed by "BC-1" process method of the process device 29 which is the cleaning device. "BC-1" (Backside cleaning-1) is the backside cleaning process method for a SiN layer. As illustrated in FIG. 21, a Si layer of the region R1 and the SiN layer of the region R2 are formed up to the third process step.

Figure 22:
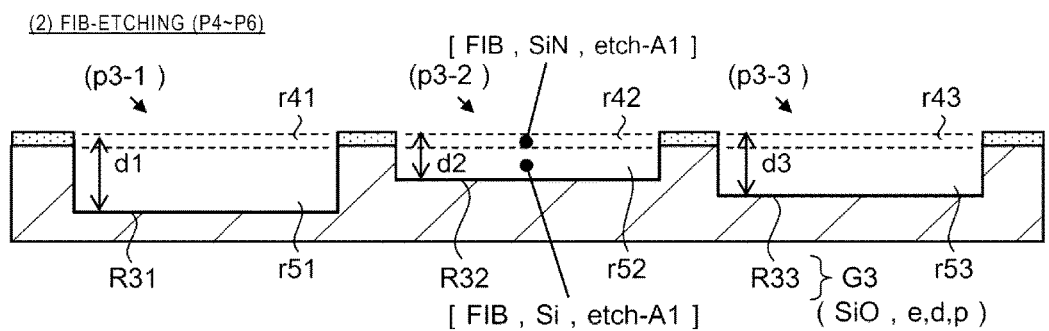
FIG. 22 is a diagram illustrating a second example of a cross section of process steps in the embodiment.

(2) FIG. 22 illustrates an etching step and the like of the FIB method corresponding to a fourth process step to a sixth process step. "e, d, and p" (etching, deposition, and planarization) are designated to flag values regarding regions R31 to R33 of a group G3. According to the flag values, the generating unit 12 generates the fourth process step to a ninth process step as a plurality of process steps for forming regions of cavity portions using the process method of etching, deposition, and planarization. In the fourth process step and the fifth process step, the regions R31 to R33 corresponding to the cavity portions are formed.

The fourth process step illustrated in P4 is a step in which etching is performed to the SiN layer of the region R2 using "etch-A1" process method of the process device 21 which is the FIB device.

The fifth process step illustrated in P5 is a step in which etching is performed to the Si layer of the region R1 using "etch-A1" process method of the process device 21 which is the FIB device. In the fifth process step, etching is sequentially performed to three regions r51 to r53 in the Si layer in FIG. 22.

More specifically, the fourth process step to the ninth process step are configured to include process steps p3-1 to p3-3 for each of the regions R31 to R33 in the X direction in FIG. 22. In a case of the FIB method, these process steps can be realized as continuous one process step by beam scanning. In the fourth process step, etching is sequentially performed to three regions r41 to r43 in the SiN layer. In the fifth process step, etching is sequentially performed to three regions r51 to r53 in the Si layer. Depths of the regions R31 to R33 of the cavity portions of the group G3 in the Z direction are illustrated by d1 to d3. d2<d3<d1 is satisfied. The depth of each of ranges is designated by the control parameter value of the recipe. As described above, in a case of the branch pattern using a photolithography process method of non-FIB, a process step for each of the divided layer is generated according to the process depth of the Z direction.

The sixth process step illustrated in P6 is a step which is automatically added based on the rule setting information 65 and a step in which backside cleaning is performed by "BC-1" process method of the process device 29 which is the cleaning device. In the sixth process step, cleaning is performed to the regions R31 to R33 of the cavity portions of the group G3.

Other flag values corresponding to the flag values of "e, d, and p" for designating formation of the region 103 of the cavity portion may be set in the flag setting information 64, and it is possible to realize the formation of the region 103 in the same manner using these flag values.

Figure 23:
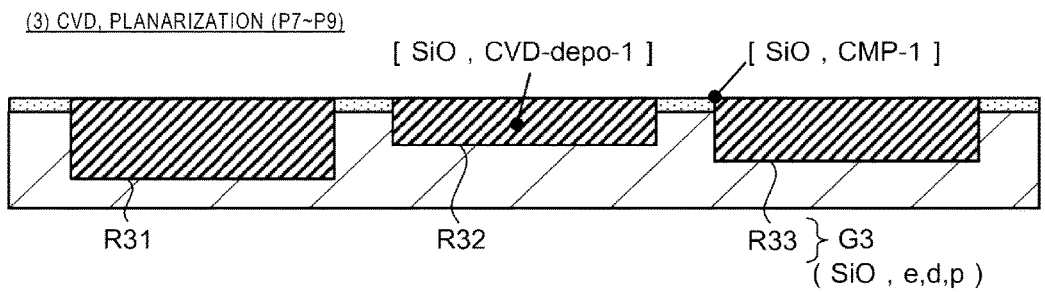
FIG. 23 is a diagram illustrating a third example of a cross section of process steps in the embodiment.

(3) FIG. 23 illustrates a CVD step, a planarization step, or the like corresponding to the seventh process step to the ninth process step.

The seventh process step illustrated in P7 is a step in which deposition of SiO is performed using "CVD-depo-1" process method of the process device 2 which is the CVD device.

The eighth process step illustrated in P8 is a step which is automatically added based on the rule setting information 65 and a step in which backside cleaning is performed by "BC-2" process method of the process device 29 which is the cleaning device. In the eighth process step, cleaning is performed to the Si substrate.

The ninth process step illustrated in P9 is a step in which planarization of SiO formed in P7 is performed up to an upper surface of the SiN layer using "CMP-1" process method of the process device 27 which is the CMP device. Thus, as illustrated FIG. 23, three SiO portions in which SiO is deposited are formed. This SiO portion corresponds to a sacrificial layer for forming the structure portion on the cavity portion and is removed in a post-process step.

Figure 24:
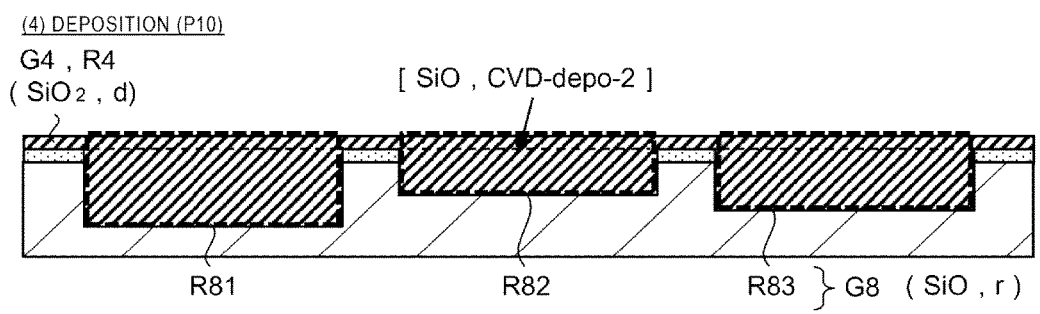
FIG. 24 is a diagram illustrating a fourth example of a cross section of a process step in the embodiment.

(4) FIG. 24 illustrates a deposition step corresponding to a tenth process step. Ina region R4 of a group G4, a material is set to $SiO_2$ and the flag value is set to "d". The region R4 of the group G4 includes a part of regions R81 to R83 of a group G8 (difference between group G8 and group G3). In the regions R81 to R83 of the group G8, a material is set to SiO and the flag value is set to "r". The generating unit 12 provides the tenth process step in which deposition is performed as a process step for a process of the region R4 according to a setting value of the group G4.

The tenth process step illustrated in P10 is a step in which deposition of SiO is performed to the region R4 using "CVD-depo-2" process method of the process device 26 which is the CVD device. Thus, an $SiO_2$ layer of the region R4 is film-formed and three SiO portions corresponding to the regions R81 to R83 of the group G8 are also formed.

Figure 25:
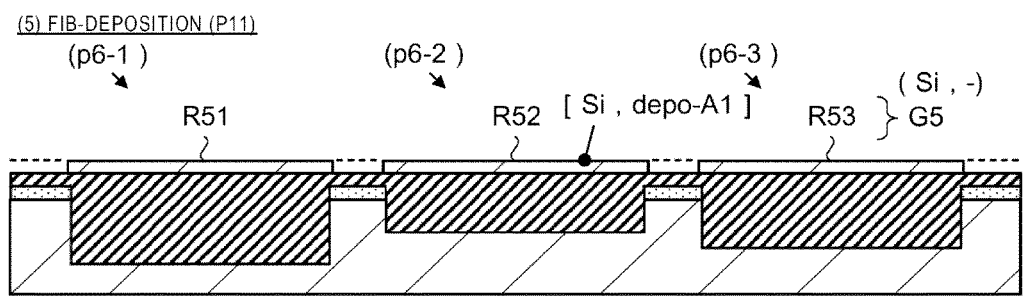
FIG. 25 is a diagram illustrating a fifth example of a cross section of a process step in the embodiment.

(5) FIG. 25 illustrates a deposition step of the FIB method corresponding to an eleventh process step. In regions R51 to R53 of a group G5, a material is set to Si and the flag value is not set. The generating unit 12 provides the eleventh process step as a process step for a process of the group G5.

The eleventh process step illustrated in P11 is a step in which deposition of Si is performed to the region R5 using "depo-A1" process method of the process device 21 which is the FIB device. Thus, the regions R51 to R53 corresponding to three Si portions are formed on the $SiO_2$ layer. The eleventh process step corresponds a branch pattern in a case of selectively performing deposition for each of ranges of the X direction by beam scanning using the FIB method. In other branch patterns, a process step or the like in which regions of the group G5 are formed by deposition and etching is generated. In this branch pattern, a Si film is film-formed by the deposition process step and unnecessary parts are removed again by the etching process step to form three Si portions.

Figure 26:
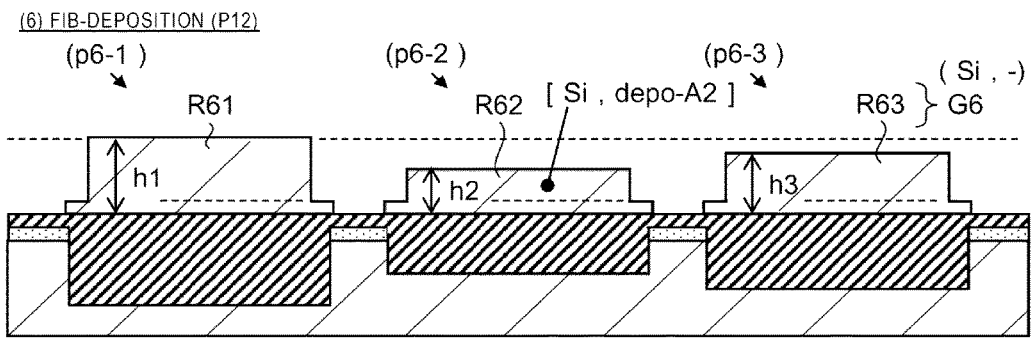
FIG. 26 is a diagram illustrating a sixth example of a cross section of a process step in the embodiment.

(6) FIG. 26 illustrates a deposition step of the FIB method corresponding to a twelfth process step. In regions R61 to R63 of a group G6, a material is set to Si and the flag value is not set. The generating unit 12 provides the twelfth process step as a process step for a process of the group G6.

The twelfth process step illustrated in P12 is a step in which deposition of Si is performed to the region R6 using "depo-A2" process method of the process device 21 which is the FIB device. Thus, the regions R61 to R63 corresponding to the three Si portions are formed again on the regions R51 to R53 of the three Si portions. Thus, three structure portions are formed on the three cavity portions. The twelfth process step corresponds a branch pattern in a case of selectively performing deposition for each of ranges of the X direction by beam scanning using the FIB method. In other branch patterns, a process step or the like in which regions of the group G6 are formed by deposition and etching is generated. In this branch pattern, a Si film is film-formed by the deposition process step and unnecessary parts are removed again by the etching process step to form three Si portions.

More specifically, the eleventh process step and the twelfth process step are configured to include process steps p6-1 to p6-3 for each of the regions R51 to R53 and the regions R61 to R63 in the X direction in FIG. 26. In a case of the FIB method, these process steps can be realized as continuous one process step by beam scanning. The three regions R51 to R53 are sequentially deposited in the eleventh process step and the three regions R61 to R63 are sequentially deposited in the twelfth process step. Heights of the three structure portions by the group G5 and the group G6 are illustrated by h1 to h3. h2<h3<h1 is satisfied. The height of each of ranges is designated by the control parameter value of the recipe. As described above, in a case of the branch pattern using a photolithography process method of non-FIB, a process step for each of the divided layer is generated according to the process height of the Z direction.

Figure 27:
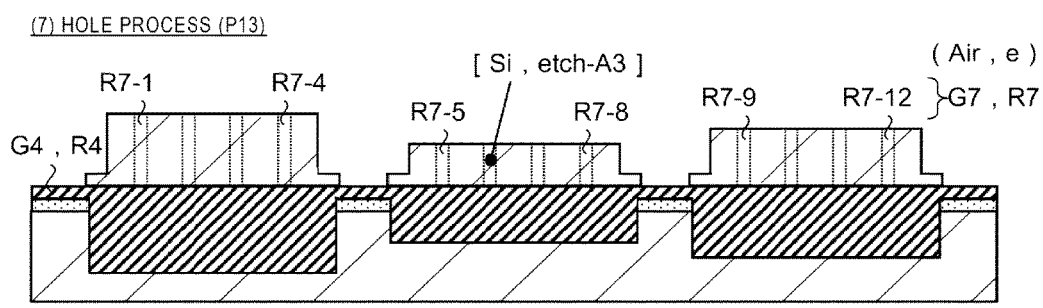
FIG. 27 is a diagram illustrating a seventh example of a cross section of a process step in the embodiment.

(7) FIG. 27 illustrates a hole process step using etching of the FIB method corresponding to a thirteenth process step. In a region of a group G7, a material is set to air and the flag value is set to "e". The generating unit 12 provides the thirteenth process step as a process step for a hole process with respect to the region of the group G7.

The thirteenth process step illustrated in P13 is a step in which etching is performed to the region of the group G7 using "etch-A3" process method of the process device 21 which is the FIB device. "etch-A3" process method is a process method corresponding to the hole process. Thus, a plurality of holes penetrating in the Z direction are formed in the three Si portions of the group G5 and the group G6 as the region of the group G7. For example, regions R7-1 to R7-12 are illustrated as the region of the group G7. Each of the holes penetrates from an upper surface of the region R6 to a lower surface of the region R5 (upper surface of region R4).

As setting of the plurality of holes in the three-dimensional structure data 31, process conditions such as a position, a spacing, a diameter, and the like to form the hole may be designated using a flag or the like in addition that the hole is directly designated as a region. In addition, a value representing "hole" may be designated as a material or a flag in addition that air is designate as a material of a hole region.

Figure 28:
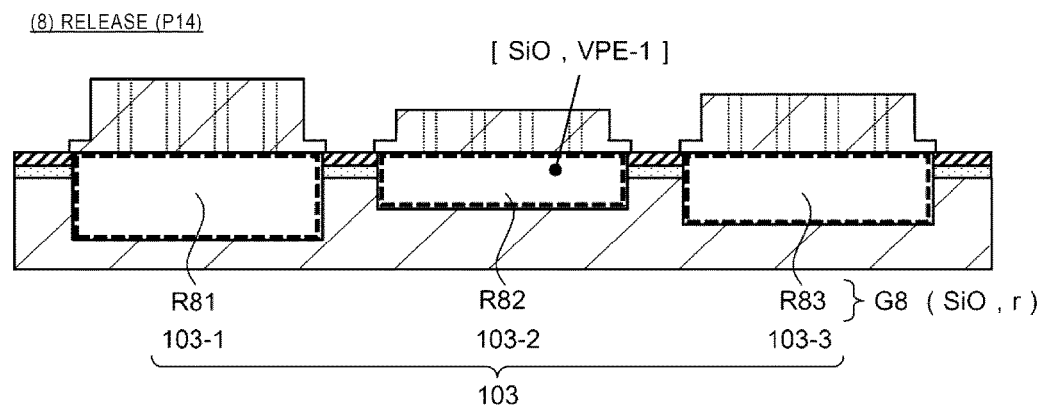
FIG. 28 is a diagram illustrating an eighth example of a cross section of a process step in the embodiment.

(8) FIG. 28 illustrates a release step corresponding to a fourteenth process step. In regions R81 to R83 of a group G8, a material is set to air and the flag value is set to "r". The generating unit 12 provides the fourteenth process step using a release process method as a process step for processing the regions of the group G8 according to the flag value of the group G8.

The fourteenth process step illustrated in P14 is a step in which the SiO portions of the regions R81 to R83 of the group G8 are released using "VPE-1" process method of the process device 28 which is the VPE device. Thus, the region 103 of three cavity portions is formed in the regions R81 to R83 of the group G8. In this fourteenth process step, gas or liquid is introduced into the region of the group G8 through the plurality of holes of the group G7 and the SiO portions are removed by VPE.

In the manufacturing process flow of the first example, the VPE process method is adopted according to designation of the flag value="r" for the process steps of the region of the group G8. For the region of the group G8, in a case where the flag value="r" is not designated, for example, the flag value also may be designated as a void. In this case, the generating unit 12 generates a branch pattern corresponding to a combination of the process method which can be adopted for forming a void region while considering a connection relationship with a region in a periphery of the void region. The total process time is calculated and, for example, the shortest flow is output in the manufacturing process flow capable of corresponding to the branch pattern.

In a case of designating process time priority, the generating unit 12 compares the total process times and determines the optimal first flow or the like with respect to the generated plurality of manufacturing process flows having the manufacturing process flow described in the first example. For example, the generating unit 12 generates a plurality of branch patterns by a combination of possible process methods when a process step and a recipe regarding the region of the group G3 corresponding to the cavity portion are generated. This branch pattern includes a branch pattern corresponding to case division of at least two of the process method of the FIB device of the FIB method and the process method of the lithography device or the like of the non-FIB method. The generating unit 12 compares the total process times of the manufacturing process flows of the branch pattern, thus, for example, the total process time of the manufacturing process flow of the first example is the shortest. For this reason, the generating unit 12 outputs the manufacturing process flow of the first example as an optimal first flow.

Manufacturing Process Flow Generation Example (2)

FIG. 19 illustrates a second example of the manufacturing process flow generated by the generating unit 12 for the same structure. This second example is an example of an optimal first flow among the plurality of manufacturing process flows generated in a case where the process accuracy takes priority. This second example is particularly a case where the process accuracy is high in the process method of the non-FIB method than the FIB method for a process step for the process of the regions R31 to R33 of the group G3 in FIG. 15. For this reason, the manufacturing process flow of the second example as an optimal first flow is output.

In the manufacturing process flow of the second example in FIG. 19, a fourth process step to an eighteenth process step are generated as a plurality of process steps for a process of the three regions R31 to R33 of the group G3 in FIG. 15. This process step is approximately generated as four process groups (P4 to P7, P8 to P11, p12 to P15, and P16 to P18).

The fourth process step illustrated in P4 is a step in which a lithography process (application, exposure, developing, baking, and the like described above) is performed to the region of the group G3 using "Litho-1" process method of the process device 23 which is the lithography device which is the non-FIB method.

The fifth process step illustrated in P5 is a step in which dry etching, ashing, and the like of the SiN layer are performed to the region of the group G3 using "dry-etch-1" process method of the process device 24 which is an etching device which is the non-FIB method.

The sixth process step illustrated in P6 is a step in which dry etching, ashing, and the like of the Si layer are performed to a part of the region of the group G3 using "dry-etch-1" process method of the process device 24 in the same manner.

The seventh process step illustrated in P7 is a step which is automatically added and a step in which cleaning is performed to the Si substrate using "BC-1" process method of the process device 29 which is the cleaning device.

The eighth process step illustrated in P8 is a step in which the lithography process is performed to other parts of the region of the group G3 using "Litho-2" process method of the process device 23. In the eighth process step, since a reticle different from the fourth process step is used, different process method is used. The ninth process step illustrated in P9 is a step in which dry etching and the like of the SiN layer are performed to other regions of the group G3 using "dry-etch-1" process method of the process device 24. The process method of the ninth process step is the same as the fifth process step. The tenth process step illustrated in P10 is a step in which dry etching and the like of the Si layer are performed to other regions of the group G3 using "dry-etch-1" process method of the process device 24 in the same manner. Although, the process method of the tenth process step is the same as the sixth process step, a control parameter value of a recipe of the tenth process step is different from the sixth process step. The eleventh process step illustrated in P11 is a step which is automatically added and a step in which cleaning is performed to the Si substrate using "BC-1" process method of the process device 29.

In the same manner, in the twelfth process step illustrated in P12 to the fifteenth process step illustrated in P15, photolithography, dry etching, cleaning, and the like are performed to other regions of the group G3. In the sixteenth process step illustrated in P16 to the eighteenth process step illustrated in P18, deposition is performed by CVD and planarization is performed by CMP in the same manner as the process steps of P7 to P9 of the manufacturing process flow of the first example.

Manufacturing Process Flow Generation Example (3)

FIG. 20 illustrates a third example of the manufacturing process flow generated by the generating unit 12. This third example is another example of an optimal first flow among the plurality of manufacturing process flows generated in a case where the process time takes priority. This third example is particularly a case where the total process time is short in the process method of the non-FIB method than the FIB method for a process step for the process of the region of the group G5 in FIG. 15. For this reason, the manufacturing process flow of the third example as an optimal first flow is output.

In the manufacturing process flow of the third example in FIG. 20, an eleventh process step to a fifteenth process step are generated as a plurality of process steps for a process of the three regions R51 to R53 of the group G5 in FIG. 15.

The eleventh process step illustrated in P11 is a step in which a Si layer is formed using "CVD-depo-1" process method of the process device 26 which is the CVD device. The twelfth process step illustrated in P12 is a step which is automatically added and a step in which cleaning is performed to the Si substrate using "BC-1" process method of the process device 29 which is the cleaning device. The thirteenth process step illustrated in P13 is a step in which the lithography process is performed to the region of the group G5 using "Litho-1" process method of the process device 23 which is the lithography device. The fourteenth process step illustrated in P14 is a step in which dry etching and the like of the Si layer are performed to the region of the group G5 using "dry-etch-1" process method of the process device 24 which is the etching device. The fifteenth process step illustrated in P15 is a step which is automatically added and a step in which cleaning is performed to the Si substrate using "BC-1" process method of the process device 29 which is the cleaning device.

Coordinate System

Figure 29:
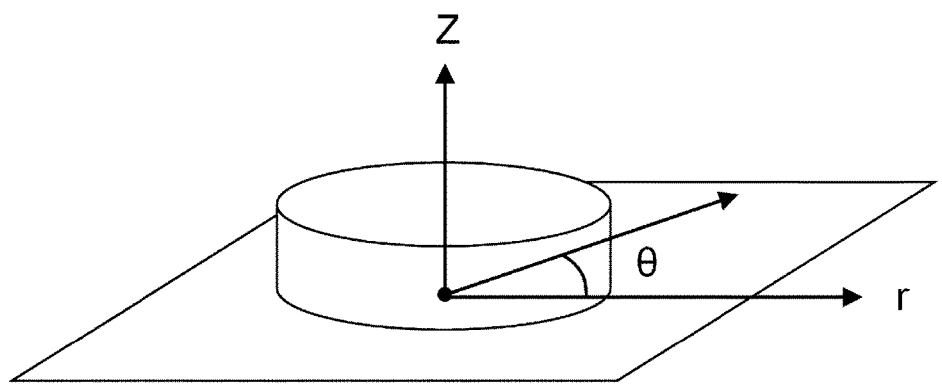
FIG. 29 is a diagram illustrating a cylindrical coordinate system in the embodiment.

A coordinate system of the coordinates data in the three-dimensional structure input data is not limited to the rectangular coordinates system(X, Y, and Z) described above, can be a cylindrical coordinates system (r, θ, and z) or the like in FIG. 29.

Effects

As described above, according to the manufacturing device or the like of the embodiment, it is possible to reduce labor involved in work regarding a design procedure of the structure manufacturing process flow of the designer and to shorten a time required for the work. Further, according to the embodiment, it is possible to shorten a total time required for a manufacturing procedure including a design procedure and a process procedure and to increase development manufacturing efficiency. Even in a case where trial manufacture of the structure is repeated, it can be realized in a short period of time. In this manufacturing system, it is possible to automatically operate the process manufacturing of each of the process devices 2 by the recipe of the manufacturing process flow from the manufacturing device 1 and to improve efficiency of process manufacturing. In this manufacturing system, it is possible to generate the preferable manufacturing process flow with both of the FIB method and the non-FIB method as candidates. In this manufacturing system, it is possible to generate the preferable manufacturing process flow with division of the process time and the process accuracy. In this manufacturing system, it is possible to control generating the preferable manufacturing process flow by setting of the additional information 32.

Although the present invention has been specifically described based on the embodiment, the present invention is not limited to the above embodiment, and various modifications can be made without departing from a gist thereof.

What is claimed is:

1. A manufacturing device for supporting work including designing of a manufacturing process flow of a structure, comprising:
    an input unit that inputs design information including three-dimensional data of the structure from an outside based on an input operation of a user;
    setting information for generating the manufacturing process flow;
    a generating unit that generates the manufacturing process flow configured to have a plurality of process steps in order based on the design information and the setting information; and
    an output unit that displays the generated manufacturing process flow to the user on a screen for the user to check, modify, and confirm the manufacturing process flow,
    wherein the setting information includes process methods, control parameters of process steps using the process method, and information for calculating a process time for each of the process methods with respect to each of a plurality of process devices for processing the structure,
    the process method includes a first process method of a direct modeling method having an FIB method and a second process method of a semiconductor manufacturing process method which is a non-FIB method,
    the generating unit generates a plurality of manufacturing process flows by a combination of cases where each of the process methods in a plurality of process methods is applied to each region of the input three-dimensional data,
    the plurality of manufacturing process flows include a first manufacturing process flow having a first process step in a case of using the first process method and a second manufacturing process flow having a second process step in a case of using the second process method,
    the manufacturing process flow includes the process device to be used, the process method, a control parameter value, the process time, and a total process time of the plurality of process steps for each of the process steps, and
    the output unit outputs at least a manufacturing process flow having the shortest total process time among the plurality of manufacturing process flows.

2. The manufacturing device according to claim 1, wherein recipe information including the control parameter value of the process step of each of the process devices is output to each of the process devices and the process device is controlled to execute a process of the structure based on the confirmed manufacturing process flow.

3. The manufacturing device according to claim 1, wherein the input unit sets an additional information including a material to each of the regions of the three-dimensional data or inputs the three-dimensional data in which the additional information including the material is set from the outside based on the input operation of the user, the material can be selectively designated by a plurality of materials including air and a void, and
    the generating unit applies the process method of the manufacturing process flow according to the additional information of each of the regions.

4. The manufacturing device according to claim 1, wherein the input unit sets the additional information including a flag to each of the regions of the three-dimensional data or inputs the three-dimensional data in which the additional information including the flag is set from the outside based on the input operation of the user,
    the flag can be selectively designated by the plurality of process methods or process method classification, and
    the generating unit applies the process method of the manufacturing process flow according to the additional information of each of the regions.

5. The manufacturing device according to claim 1, wherein the generating unit generates the first manufacturing process flow including a process step for changing the control parameter value according to a depth or a height of a process for each of ranges of the region with respect to the first process step using the first process method, and
    generates the second manufacturing process flow including a plurality of process steps of a plurality of divided layers according to a depth or a height of a process of the region with respect to the second process step using the second process method.

6. The manufacturing device according to claim 1, wherein, in the setting information, a process time setting value or a process rate is set for each of the process methods and each of the materials, and
    the generating unit calculates the process time of each of the process steps using the process time setting value or a process region size and the process rate of each of the process steps and calculates the total process time by a comprehensive calculation of the process time of each of the process steps.

7. The manufacturing device according to claim 1, wherein, in the setting information, process accuracy is set for each of the process methods and each of the materials,
    the generating unit calculates an index value of a total process accuracy of the whole manufacturing process flow by the comprehensive calculation using the process accuracy for each of the process steps,
    the generated manufacturing process flow includes the process accuracy and the total process accuracy for each of the process steps, and
    the output unit outputs at least a manufacturing process flow having the highest total process accuracy among the plurality of manufacturing process flows.

8. The manufacturing device according to claim 1, wherein, in the setting information, rules including an order of the process steps corresponding to the process methods are set, and
    the generating unit automatically adds the process step of the manufacturing process flow according to the rule.

9. A manufacturing system comprising:
a manufacturing device that supports work including designing of a manufacturing process flow of a structure;
a plurality of process devices for performing a process of the structure; and
a design device that designs design information including three-dimensional data of the structure,
wherein the manufacturing device includes:
an input unit that inputs the design information including the three-dimensional data of the structure from the design device based on an input operation of a user;
setting information for generating the manufacturing process flow;
a generating unit that generates the manufacturing process flow configured to have a plurality of process steps in order based on the design information and the setting information; and
an output unit that displays the generated manufacturing process flow to the user on a screen for the user to check, modify, and confirm the manufacturing process flow,
wherein the setting information includes process methods, control parameters of process steps using the process method, and information for calculating a process time for each of the process methods with respect to each of a plurality of process devices,
the process method includes a first process method of a direct modeling method having an FIB method and a second process method of a semiconductor manufacturing process method which is a non-FIB method,
the generating unit generates a plurality of manufacturing process flows by a combination of cases where each of the process methods in a plurality of process methods is applied to each region of the input three-dimensional data,
the plurality of manufacturing process flows includes a first manufacturing process flow having a first process step in a case of using the first process method and a second manufacturing process flow having a second process step in a case of using the second process method,
the manufacturing process flow includes the process device to be used, the process method, a control parameter value, the process time, and a total process time of the plurality of process steps for each of the process steps, and
the output unit outputs at least a manufacturing process flow having the shortest total process time among the plurality of manufacturing process flows.

10. The manufacturing system according to claim 9,
wherein the manufacturing device outputs recipe information including the control parameter value of the process step of each of the process devices to each of the process devices and controls the process device to execute a process of the structure based on the confirmed manufacturing process flow.

11. A manufacturing method in a manufacturing device for supporting work including designing of a manufacturing process flow of a structure, comprising:
executing the manufacturing device;
inputting design information including three-dimensional data of the structure from an outside based on an input operation of a user;
generating the manufacturing process flow configured to have a plurality of process steps in order based on the design information and the setting information for generating the manufacturing process flow; and
outputting the generated manufacturing process flow to the user on a screen for the user to check, modify, and confirm the manufacturing process flow,
wherein the setting information includes process methods, control parameters of process steps using the process method, and information for calculating a process time for each of the process methods with respect to each of a plurality of process devices for processing the structure,
the process method includes a first process method of a direct modeling method having an FIB method and a second process method of a semiconductor manufacturing process method which is a non-FIB method,
the generating includes generating a plurality of manufacturing process flows by a combination of cases where each of the process methods in a plurality of process methods is applied to each of regions of the input three-dimensional data,
the plurality of manufacturing process flows include a first manufacturing process flow having a first process step in a case of using the first process method and a second manufacturing process flow having a second process step in a case of using the second process method,
the manufacturing process flow includes the process device to be used, the process method, a control parameter value, the process time, and a total process time of the plurality of process steps for each of the process steps, and
the outputting includes outputting at least a manufacturing process flow having the shortest total process time among the plurality of manufacturing process flows.

* * * * *